US008127018B2

(12) United States Patent
Frutiger

(10) Patent No.: US 8,127,018 B2
(45) Date of Patent: Feb. 28, 2012

(54) REDIRECTION TECHNIQUES IN A COMMUNICATION NETWORK

(75) Inventor: Stefan Frutiger, Wangen (CH)

(73) Assignee: UBS AG, Zurich (CH)

( * ) Notice: Subject to any disclaimer, the term of this patent is extended or adjusted under 35 U.S.C. 154(b) by 408 days.

(21) Appl. No.: 11/898,733

(22) Filed: Sep. 14, 2007

(65) Prior Publication Data

US 2009/0019143 A1 Jan. 15, 2009

(30) Foreign Application Priority Data

Jul. 10, 2007 (EP) .................................... 07013525

(51) Int. Cl.
*G06F 15/173* (2006.01)
(52) U.S. Cl. ...................................... 709/227; 709/225
(58) Field of Classification Search .................. 709/225, 709/227–229
See application file for complete search history.

(56) References Cited

U.S. PATENT DOCUMENTS

| | | | | |
|---|---|---|---|---|
| 5,708,780 | A * | 1/1998 | Levergood et al. | 709/229 |
| 5,987,523 | A * | 11/1999 | Hind et al. | 709/245 |
| 6,718,387 | B1 * | 4/2004 | Gupta et al. | 709/226 |
| 7,441,045 | B2 * | 10/2008 | Skene et al. | 709/241 |
| 7,509,369 | B1 * | 3/2009 | Tormasov | 709/201 |
| 2002/0010795 | A1 * | 1/2002 | Brown | 709/245 |
| 2004/0039827 | A1 * | 2/2004 | Thomas et al. | 709/228 |
| 2006/0242300 | A1 * | 10/2006 | Yumoto et al. | 709/226 |
| 2008/0046340 | A1 * | 2/2008 | Brown | 705/26 |

OTHER PUBLICATIONS

European Search Report mailed by the European Patent Office on Feb. 7, 2008 for counterpart European Application No. 07013525.6 (8 pages). Zeus Technology Limited, "ZXTM GLB, Scaling your services with ZXTM Global Load Balancer" [Online], Jun. 30, 2007 Retrieved from the Internet: URL:http://www.zeus.com/documents/en/Sc/Scaling_with_ZXTM_GLB.pdf> [retrieved on Jan. 24, 2008], 13 pages.
Zeus Technology Limited, "Multi-site session persistence with ZXTM GLB and ZXTM" [Online] Jun. 30, 2007 Retrieved from the Internet: URL:http://www.zeus.com/documents/en/ZX/ZXTM_GLB-multisite_persistence.pdf> [retrieved on Jan. 24, 2008]; 3 pages.
Broadband-testing, "Zeus Extensible Traffic Manager (ZXTM), A Broadband-Testing Report" [Online] 2004, Retrieved from the Internet: URL:http://www.zeus.com/documents/en/br/broadband-testing_zxtm.pdf> [retrieved on Jan. 24, 2008]; 29 pages.
Altavista, "Multi-site session persistence with ZXTM GLB and ZXTM" [Online], Retrieved from the Internet: URL:http://de.altavista.com/web/results?itag=ody&pg=ag&agmode=s&aga=Multi-site+session+persistence+with+ZXTM+GLB+and+ZXTM&agp=&aqo=&aqn=&kgs=0&kls=0&d2=0&dt=dtrange&dfr%5BD%5D=1&dfr%5Bm%5D=1&dfr%5By%5D=1980&dto%5Bd%5D=30%dto%5Bm%5D=6&dto%5By%5D=2007&filetype=&rc=dmn&swd=&1h=&nbg=10> [retrieved on Jan. 24, 2008]; 2 pages.

* cited by examiner

*Primary Examiner* — Larry Donaghue
(74) *Attorney, Agent, or Firm* — Finnegan, Henderson, Farabow, Garrett & Dunner, LLP

(57) ABSTRACT

Systems and methods are provided for redirecting a client device to a network service in a communication network is described. In one implementation, the communication network includes at least a first and a second service provisioning environment each capable of providing the network service. The service provisioning environments are addressable under a common first domain name that is resolvable into a dedicated first network address of each service provisioning environment. In accordance with an exemplary method, the following steps are carried out in the first service provisioning environment: receiving a first client request at a first network address of the first service provisioning environment, responding to the first client request with a redirection to a dedicated second domain name of the first service provisioning environment, the second domain name being resolvable into a second network address of the first service provisioning environment, receiving a second client request at the second network address, and initiating the establishment of a session with the requesting client device over the second network address to provide the network service.

24 Claims, 14 Drawing Sheets

REDIRECTION TECHNIQUES IN A COMMUNICATION NETWORK

TECHNICAL FIELD

The present invention generally relates to a communication network including a service provisioning domain with two or more service provisioning environments. In particular, the invention relates to systems and methods for redirecting a client device to a specific service provisioning environment within the communication network.

BACKGROUND

In the field of communication networks, redirection is a technique that causes a service provisioning environment such as a network server receiving a particular client request to not actually serve this request, but to redirect instead the client device to another network server. Redirection is a powerful tool for various purposes such as load sharing (also called workload distribution) among multiple service provisioning environments that are in operation simultaneously. Using redirection signaling, client requests can be evenly distributed among the individual environments, and the overall processing load can thus be shared within the service provisioning domain. Closely related to the task of load sharing is the aspect of redundancy, which ensures that a client request can still be served in case one or more of the service provisioning environments have to be taken out of service.

Modern communication networks are typically horizontally structured into individual layers with dedicated communication protocols being used on each layer. Load sharing mechanisms can be set up on various of these layers, such as on the network layer (layer 3 in the Open System Interconnection Basic Reference Model, or, in short, OSI model) or on the data link layer (layer 2 in the OSI model). Recent experience has shown that it is in many cases desirable to separate the individual service provisioning environments on the network level. Such a layer 3 separation has the advantage that the not uncommon failure of individual network components (including switches and connectors) will not lead to an outage of the whole service provisioning domain, but will only effect a single environment.

When separating the service provisioning environments on the network layer, each individual environment may receive a dedicated network address such as an Internet Protocol (IP) address. In modern communication networks, the Internet Protocol is the standard layer 3 protocol. According to IP version 4 (Ipv4), an IP network address is a 4 byte (32 bit) address having the format byte1.byte2.byte3.byte4, for example 127.0.0.33.

Due to their numerical structure, IP addresses are difficult to use (and in particular to remember) for end users. Moreover, IP addresses are often assigned dynamically and may thus change from time to time. To facilitate the addressing of network re-sources, the Domain Name System (DNS) has been deployed. DNS may be regarded as a distributed database that associates human-readable host names (also called domain names, such as "connect.ubs.com") with abstract network addresses (such as numerical IP addresses). Upon request, DNS translates (or resolves) a domain name into the appropriate network address.

The resolving feature of DNS can be used for implementing load sharing on layer 3. In a DNS-based load sharing scenario, a domain name such as "connect.ubs.com" is assigned to a service provisioning domain, and each service provisioning environment within this domain receives a designated network address. Upon receiving a client request for resolving the domain name "connect.ubs.com", DNS selects one of the network addresses of the service provisioning environments (e.g. according to a round robin scheme or in a random manner) and responds to the client request with the selected network address. Alternatively, the selection may be performed on the client side. In this case, DNS responds with a list of network addresses of the service provisioning environments, and the selection of one specific network address (environment) is performed by e.g. a browser installed on the client device.

The client software often includes a routine (typically implemented in the browser) which automatically requests a new resolution of a domain name during an ongoing session of the client device (such a new resolution may also be performed in response to a user request). The session may involve a service provisioning environment that has previously been assigned to the client device by the DNS-based or any other load sharing mechanism. In the case of a new domain name resolution during an ongoing session, the load sharing mechanism may return the network address of an environment that is different from the environment involved in the ongoing session. This scenario will lead to indefinite states as a second (parallel) session may be set up between the client device and the other environment. Moreover, time-outs in the first (initial) session may occur.

Accordingly, domain name resolution processes during an ongoing session may interfere with load sharing mechanisms. Thus, there is a need for systems and methods that provide a better user experience in the above and similar scenarios.

SUMMARY

In accordance with an embodiment of the invention, a method of redirecting a client device to network service in a communication network is provided, wherein the communication network includes at least a first and a second service provisioning environment each capable of providing the network service and wherein the service provisioning environments are addressable under a common first domain name resolvable into a first network address of each service provisioning environment. The method comprises the following steps that are carried out in the first service provisioning environment: receiving a first client request at the first network address of the first service provisioning environment; responding to the first client request with a redirection to a dedicated second domain of the first service provisioning environment, the second domain name being resolvable into a second network address of the first service provisioning environment; receiving a second client request at the second network address of the first service provisioning environment; and initiating the establishment of a session with the client device to provide the network service.

By providing the requested service under the dedicated second domain name of the first service provisioning environment, instead of under the domain name common to the plurality of service provisioning environments, it is ensured that any new resolution of the second domain name will typically lead to a direction to the first service provisioning environment. Moreover, this approach facilitates the implementation of load balancing mechanisms and redundancy techniques, which can for example be performed based on the common first domain name. Additional benefits of the first aspect outlined above will become apparent in the following.

Each service provisioning environment may include a service provisioning cluster of two or more servers each capable of providing the requested network service. In such a case, each service provisioning environment may include a load balancing mechanism that performs load balancing among the servers of the local cluster.

According to a first variant, two or more (or all) service provisioning environments are co-located at a single geographical site. According to a second variant, the service provisioning environments are located at geographically spaced-apart sites. The second variant guarantees that the network service can still be provided in case of a disastrous event having only a local impact.

In one embodiment, it is proposed to maintain state information associating the requesting client device with the first service provisioning environment. Such an association may be performed upon receipt of the first client request or, alternatively, at a later point in time. The state information may be maintained locally within the respective service provisioning environment, at a central component within the network, locally at the requesting client device, or at two or more of these places. In case the state information is maintained at the requesting client device, the state information may compromise a so-called cookie referencing the first service provisioning environment. The validity of the cookie may be limited to a single session ("session cookie").

In addition to or as an alternative to cookies, there exist various further possibilities for maintaining state information. The state information may for example be appended to the dedicated domain name of the first service provisioning environment transmitted to the client device in response to the first client request. To this end, Universal Resource Locater (URL) rewriting techniques may be employed.

At least one of the cookie and the appended state information may be returned by the client device via the second client request. The fact that only the appended state information but no cookie is returned can be interpreted in certain scenarios as indication that the client device does not provide cookie support. As a consequence, a message requesting the enablement of cookie support may be sent to the client device.

The concept of maintaining state information allows for a tracking of client devices (and of browsers installed on the client devices). Additionally, maintaining state in-formation facilitates the implementation of more sophisticated redirection scenarios among the individual service provisioning environments. From the view point of a second service provisioning environment, that has been set up in parallel to the first service provisioning environment, a further method aspect comprises the steps of receiving an initial client request at the second network address of the second service provisioning environment, the second network address being resolvable from a dedicated second domain name of the second service provisioning environment; evaluating, if available, the state information associating the requesting client device with one of the service provisioning environments; and handling the initial client request depending on the result of this evaluation of the state information. It should be noted that the initial client request need not be the very first client request in absolute terms, but is only "initial" with respect to the method steps following this request.

According to an embodiment, the evaluation of the state information reveals that no state information is available for the requesting client device. In such a case handling the initial client request may comprise redirecting the client device to the common first domain name of the first and second service provisioning environments. Such a redirection may, for example, be performed to ensure that a deployed load balancing mechanism is not circumvented. The first client request at the first network address of the first service provisioning environment may then be received in response to the redirection to (and resolution of) the common first domain name.

According to another embodiment, the evaluation step performed in response to the initial client request in the second service provisioning environment yields the result that the requesting client device is associated with the first service provisioning environment. In such a case, the step of handling the initial client request may comprise redirecting the client device to the dedicated second domain name of the first service provisioning environment. It can thus be ensured that a potential ongoing session previously initiated by the requesting client device in the first service provisioning environment is continued in the first service provisioning environment (and that no conflicting second session in the second service provisioning environment is invoked).

According to yet another embodiment, the evaluation results in the finding that the requesting client device is associated with the second service provisioning environment (e.g. because there exists an ongoing session for this client device in the second provisioning environment). In such a case, the initial client request (which might then actually be a subsequent request from the point of view of an ongoing session) may be locally handled within the second service provisioning environment.

In the above scenario it has been assumed that the initial client request has been received at the second network address of the second service provisioning environment. It may, however, also occur that the initial client request is received at the first network address of the second service provisioning environment. It may then be determined from available state information that the requesting client device is actually associated with the first client provisioning environment (e.g. due to an ongoing session). In such a scenario, a response to the initial client request may comprise a redirection to the dedicated second domain name of the first service provisioning environment. The redirection will ensure in the case of an ongoing session that this session can be continued in the first service provisioning environment.

The client request discussed above in context with the second service provisioning environment may be generated in various ways. According to a first example, the client request is generated from an earlier defined link, such as a browser bookmark activated by a user. According to a second example, the user manually types in (and activates) any network address of the second service provisioning environment into an appropriate browser field.

In one scenario, the method further comprises the step of maintaining a domain name resolution mechanism associating the domain names and the network addresses of the first and second service provisioning environments. The domain name resolution mechanism, such as a DNS, may be provided by a central network component or in a distributed manner.

Maintenance of the domain name resolution mechanism allows for the implementation of a controlled shutdown or a controlled reaction to a failure of one of the first and second service provisioning environments. More specifically, a forthcoming shut-down may be preceded by, or a reaction to a failure in a service provisioning environment may be consist of, disabling a resolution of the first and/or second domain name into the first and/or second address of the corresponding service provisioning environment. Disabling a resolution into a network address of the first or the second service provisioning environment may include removing this network address of the corresponding service provisioning environment from domain name resolution.

According to one embodiment, redirection to the first or the second service provisioning environment is blocked by excluding the first network address of the corresponding service provisioning environment from domain name resolution. According to a second variant, that may be combined with the first variant, a redirection to the first or second service provisioning environment is blocked by replacing the second network address of the corresponding service provisioning environment with a third network address of a service provisioning environment not excluded from redirection.

The third network address, which may be allocated to a specific service provisioning environment in addition to the first and second network addresses, may serve for various purposes. The third network address may, for example, belong to a mechanism which deletes, in response to a client request of client device having an ongoing session in the service provisioning environment blocked from redirection, any state information associating the requesting client device with the service provisioning environment excluded from redirection. In addition, or as an alternative, the third network address may belong to a mechanism that redirects, in response to a client request of a client device having an ongoing session in the service provisioning environment excluded from redirection, the requesting client device to the common first domain name of the service provisioning environments. In the latter case, and assuming that the first service provisioning environment has not been blocked from redirection, the first client request discussed above may be received in response to the redirection to the common first domain name.

According to another embodiment of the invention, a method of redirecting a client device to network service in a communication network service is provided, wherein the communication network includes at least a first and a second service provisioning environment each capable of providing the network service and wherein the service provisioning environments are addressable under a common first domain name resolvable into a first network address of each service provisioning environment. The method comprises the following steps that are carried out by the client device: transmitting a first client request to the first network address of the first service provisioning environment; receiving (typically from the first service provisioning environment) a redirection to a dedicated second domain name of the first service provisioning environment, the second domain name being resolvable into a second network address of the first service provisioning environment; obtaining the second network address of the first service provisioning environment; and transmitting a second client request to the second network address of the first service provisioning environment to establish a session with the first service provisioning environment for obtaining the network service.

For any of the above method aspects, the first network address of the first service provisioning environment may be selected using a global load balancing strategy distributing workload among the service provisioning environments. The global load balancing strategy may at least partially be implemented in a DNS.

According to yet another embodiment of the invention, a method of directing a client to a network service in a communication network is provided, wherein the communication network includes at least a first and a second service provisioning environment each capable of providing the network service. According to this third method aspect, the service provisioning environments are addressable under a common first domain name resolvable into a first network address of each service provisioning environment, and each service provisioning environment is additionally directly addressable under a dedicated second domain name resolvable into a second network address of the respective service provisioning environment. The method comprises the steps of maintaining a domain name resolution mechanism associating the domain names and network addresses of the first and second service provisioning environments; and disabling a redirection to the first or second service provisioning environment by excluding the first network address of the corresponding service provisioning environment from domain name resolution.

This directing method may be combined with global load balancing among the various service provisioning environments. Moreover, a local load balancing mechanism may additionally or alternatively be provided within each service provisioning environment.

With respect to a global load balancing, the domain name resolution mechanism may direct each incoming resolution request for a common first domain name to the dedicated first network address of a single service provisioning environment that has been selected by a global load balancing strategy. The global load balancing strategy may be provided on the network side (e.g. by a DNS), and it may involve the client side if required. The selection underlying the load balancing strategy can be based on a round robin scheme, on a random mechanism, or on any other suitable technique. According to another alternative, the domain name resolution mechanism responds to each incoming resolution request for the common first domain name with a list of first network addresses for enabling a selection of a specific first network address (and service provisioning environment) by a global load balancing strategy implemented on a client side.

Each service provisioning environment may include a single server or, alternatively, a service provisioning cluster. A service provisioning cluster may comprise two or more servers each capable of providing the requested network service. In case a service provisioning cluster is deployed in a service provisioning environment, the service provisioning environment may additionally include a local load balancing mechanism for performing workload distribution among the two or more servers of the service provisioning cluster.

The techniques proposed herein may be embodied as hardware, as software or as hardware-software combination. As regards a software implementation, a computer program product is provided, which comprises program code portions for performing the steps of the methods disclosed herein when the computer program product is run on one or more computing devices of a computer system. The computer program product may be stored on computer-readable recording medium such as a hard disk, a CD-ROM or the like.

According to an embodiment of the invention, a network device for redirecting a client device to a network service in a communication network is provided, wherein the communication network includes at least a first and a second service provisioning environment each capable of providing the network service, and wherein the service provisioning environments are addressable under a common first domain name resolvable into a first network address of each service provisioning environment. The network device operates on behalf of the first service provisioning environment and comprises a first interface adapted to receive a first client request at the first network address of the first service provisioning environment; a responder adapted to respond to the first client request with a redirection to a dedicated second domain name of the first service provisioning environment, the second domain name being resolvable into a second network address of the first service provisioning environment; a second interface adapted to receive a second client request at the second network address of the first service provisioning environment; and a session initiator adapted to initiate the establishment of a session with the requesting client device (e.g. over the second network address of the first service provisioning environment) to provide the re-quested network service. The network device may be located within the first service provisioning environment or at a border thereof.

According to another embodiment of the invention, a client device capable of being redirected to a network device in a communication network is provided, wherein the communication network includes at least a second and a first service provisioning environment each capable of providing the network service, and wherein the service provisioning environments are addressable under a common first domain name resolvable into a first network address of each service provisioning environment. The client device comprises a transmitter adapted to transmit a first client request to the first network address of the first service provisioning environment; an interface adapted to receive a redirection to a dedicated second domain name of the first service provisioning environment, the second domain name being resolvable into a second network address of the first service provisioning environment; and an address fetcher adapted to obtain the second network address of the first service provisioning environment and to initiate transmission of a second client request to the second network address to establish a session with the first service provisioning environment for obtaining the network service.

According to a still further embodiment of the invention, a domain name resolution device for directing a client device to a network service in a communication network is pro-vided, wherein the communication network includes at least a first and a second service provisioning environment each capable of providing the network service and wherein the service provisioning environments are addressable under a common first domain name resolvable into a first network address of each service provisioning environment and wherein each service provisioning platform is directly addressable under a dedicated second domain name resolvable into a second network address of the respective service provisioning environment. The domain name resolution device comprises a domain name resolution mechanism associating the domain names and network addresses of the first and second service provisioning environments; and a disabler adapted to disable a direction to the first or the second service provisioning environment by excluding the first network address of the corresponding service provisioning environment from domain name resolution.

BRIEF DESCRIPTION OF THE DRAWINGS

Further details and advantages will become apparent when reference is made to the following detailed description and the accompanying drawings.

DETAILED DESCRIPTION

In the following description, for purposes of explanation and not limitation, specific techniques are set forth, such as particular sequences of steps, interfaces and configurations, in order to provide a thorough understanding of the techniques presented herein. While the techniques will primarily be described in context with the Internet and the IP standard, it is clear that the techniques can also be practiced in other network types and using different communication protocols.

Those skilled in the art will further appreciate that the functions explained herein below may be implemented using software functioning in conjunction with a programmed micro processor or general purpose computer. It will also be appreciated that while the current techniques will primarily be described in the form of methods and apparatuses, the techniques may also be implemented in a computer program product as well as in a system comprising a computer processor and a memory coupled to the processor, wherein the memory is encoded with one or more programs that may realize the functions disclosed herein.

Figure 1:
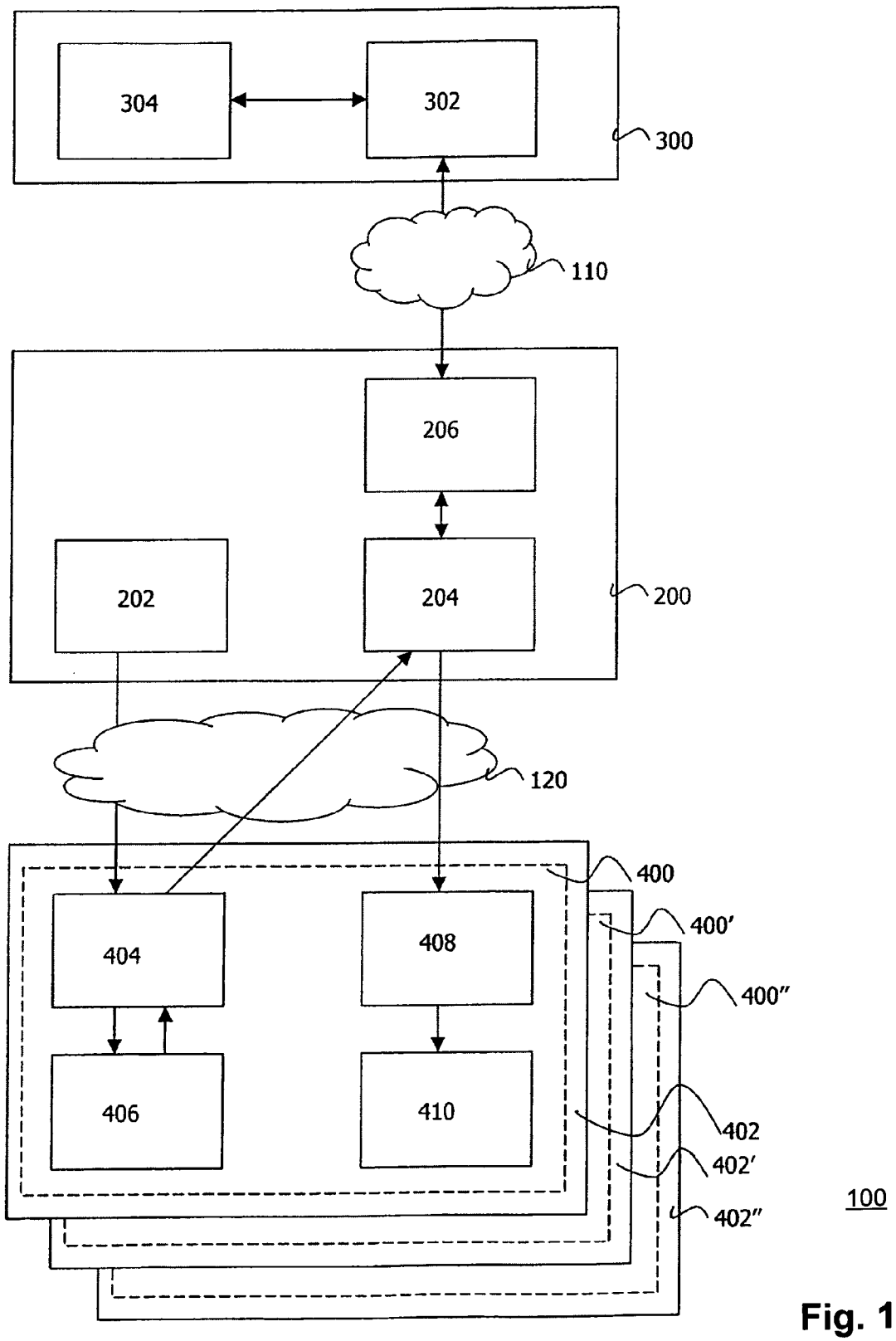
FIG. 1 illustrates a block diagram of an exemplary communication network with several devices implementing a redirection technique.

FIG. 1 schematically illustrates a communication network 100 that comprises a plurality of devices 200, 300, 400, 400', 400". Specifically, the communication network 100 comprises a client device 200, a domain name resolution device 300 as well as a plurality of network devices 400, 400', 400". The communication network 100 further includes two network connections 110, 120 that enable a communication between the devices 200, 300, 400, 400', 400".

The client device 200 can be implemented as a personal computer (PC), as a personal digital assistant (PDA), as a mobile telephone or the like. The client device 200 is configured to communicate via the first network connection 110 (which may stretch across a private network or a public network such as the Internet) with the domain name resolution device 300. Moreover, the client device 200 is further configured to communicate via the second network communication 120 (which again may stretch across a private network or a public network such as the Internet) with one or more of the network devices 400, 400', 400".

Each of the network devices 400, 400', 400" is embedded in a local service provisioning environment 402, 402', 402". In addition to the respective network device 400, 400', 400", each service provisioning environment 402, 402', 402" comprises a functionality for providing one or more network services. This functionality can be incorporated into the respective network device 400, 400', 400" or, in the alternative, it may be provided in the form of a local server or server cluster (not shown) in communication with the respective network device 400, 400', 400". The service provisioning environments 402, 402', 402" provide at least some of the network services in a redundant manner.

As the client device 200 is generally only interested in obtaining a specific network service, it is typically not of importance to the client device 200 by which specific one of the service provisioning environments 402, 402', 402" the network service will eventually be provided. For this reason, the client device 200 need not necessarily be aware of the fact that several service provisioning environments 402, 402', 402" are set up in parallel. This permits the implementation of load balancing mechanisms or redundancy techniques to select a single one of the service provisioning environments 402, 402', 402" that is to provide the network service to the client device 200.

The plurality of service provisioning environments 402, 402', 402" is addressable under a common first domain name that can be resolved into a dedicated first net-work address of each service provisioning environment 402, 402', 402". Moreover, each individual service provisioning environment 402, 402', 402" is directly addressable under a dedicated second domain name that is resolvable into a dedicated second network address of the respective service provisioning environment 402, 402', 402". Therefore, at least two dedicated network addresses (that are unique within the communication network 100) have been allocated to each of the service provisioning environments 402, 402', 402".

With reference to FIG. 1, the client device 200 comprises a transmitter 202 adapted to transmit, via network connection 120, a first client request to the first network address of the first service provisioning environment 402. This first network address may have been obtained by the client device 200 from the domain name resolution device 300 in response to a previously performed domain name resolution process.

The client device 200 further comprises an interface 204 adapted to receive, from the first service provisioning environment 400 via network connection 120, a redirection command. The redirection command refers to a dedicated second domain name of the first service provisioning environment 402, and the second domain name is resolvable into a second network address of the first service provisioning environment 402.

Upon receipt of the redirection command via interface 204 of the client device 200, the dedicated second domain name of the first service provisioning environment 402 is forwarded to an address fetcher 206 of the client device 200. The address fetcher 206 is adapted to obtain the second network address of the first service provisioning environment 402 based on the second domain name received by the interface 204. To this end, the address fetcher 206 may communicate, via network connection 110, with the domain name resolution device 300.

The domain name resolution device 300 is configured to resolve the second domain name of the first service provisioning environment 402 obtained from the address fetcher 206 into the corresponding second network address of the first service provisioning environment, and to return the second network address to the address fetcher 206. The address fetcher 206 is further configured to initiate transmission of a second client request to the second network address of the first service provisioning environment 402 to establish a session within the first service provisioning environment 402 for obtaining the network service.

As shown in FIG. 1, the network device 400 communicating with the client device 200 comprises a first interface 404 adapted to receive the first client request at the first network address of the first service provisioning environment 402. A responder 406 of the network device 400 is adapted to respond to this first client request with a redirection to a dedicated second domain name of the first service provisioning environment 402. This dedicated second domain name is resolvable into the second network address of the first service provisioning environment 402.

The network device 400 additionally comprises a second interface 408 adapted to receive a second client request at the second network address of the first service provisioning environment 402. The second interface 408 is in communication with a session initiator 410 of the network device 400. The session initiator 410 is adapted to initiate the establishment of session with the requesting client device 200 to pro-vide the requested network service. To this end, the session initiator 410 may communicate with a server or a server cluster belonging to the first service provisioning environment 402 but not shown in FIG. 1.

In the example illustrated in FIG. 1, the domain name resolution processes discussed above in context with the client device 200 and the network device 400 run on the domain name resolution device 300. The domain name resolution device 300 comprises a domain name resolution mechanism 302 associating all of the domain names and network addresses of the service provisioning environments 402, 402', 402". The domain name resolution mechanism 302 may be based on DNS functionalities well known to the skilled artisan.

The domain name resolution device 300 further comprises a disabler 314 as shown in FIG. 1. The disabler 304 is adapted to selectively disable a direction to any one of the service provisioning environments 402, 402', 402". To this end, the disabler 304 is configured to exclude the first network address of the corresponding service provisioning environment 402, 402', 402" from domain name resolution.

Figure 2:
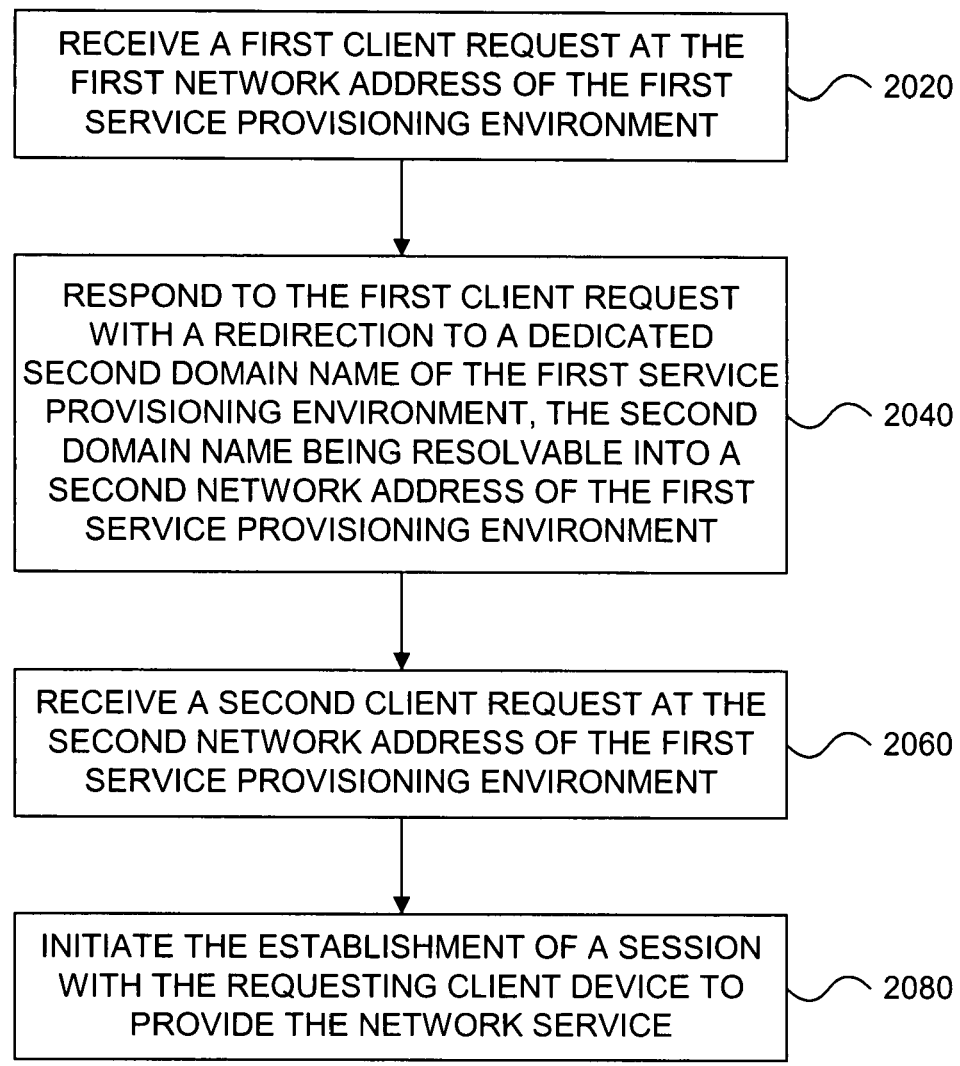
FIGS. 2 to 4 illustrate flow diagrams depicting exemplary modes of operation of the devices shown in FIG. 1.

FIG. 2 illustrates an exemplary flow diagram 2000 of the steps performed in context with redirecting a client device, such as the client device 200 shown in FIG. 1, to a network service in a communication network. The method steps may be performed by the network device 400 embedded in the first service provisioning environment 402 as illustrated in FIG. 1 or by any other central or distributed component located within or at the border of the first service provisioning environment.

The method starts, in step 2020, with receipt of a first client request at the first net-work address of a first service provisioning environment of a service provisioning domain. In one example, the first client request is a Hyper Text Transfer Protocol (HTTP) request. The first client request may relate to the establishment of a session during which a network service will be provided. The network service may be any service that can be provided by a network server, such as an e-banking service, an electronic purchasing transaction, or the like.

In a next step 2040, a response to the first client request is generated and transmitted back to the client device. The response redirects the client device to a dedicated second domain name of the first service provisioning environment. This dedicated second domain name is resolvable into a second network address of the first service provisioning environment.

In a further step 2060, a second client request of the client device having transmitted the first client request is received at the second network address of the first service provisioning environment. This means that the client device has been redirected from the first network address to the second network address of the first service provisioning environment. In the course of this redirection, the client device has been informed about the designated second domain name of the first service provisioning environment, and this second domain name (due to its unique association with the first service provisioning environment) may then safely be resolved during any subsequent (browser-initiated or user-initiated) new resolutions without the risk of directing the client to a second service provisioning environment different from the first service provisioning environment in which a session will be or has been established.

In a final step 2080, the establishment of a session with the requesting client device (over the second network address) is initiated in order to provide the requested network service. The session will typically involve the requesting client device as well as at least one server located within the first service provisioning environment.

Figure 3:
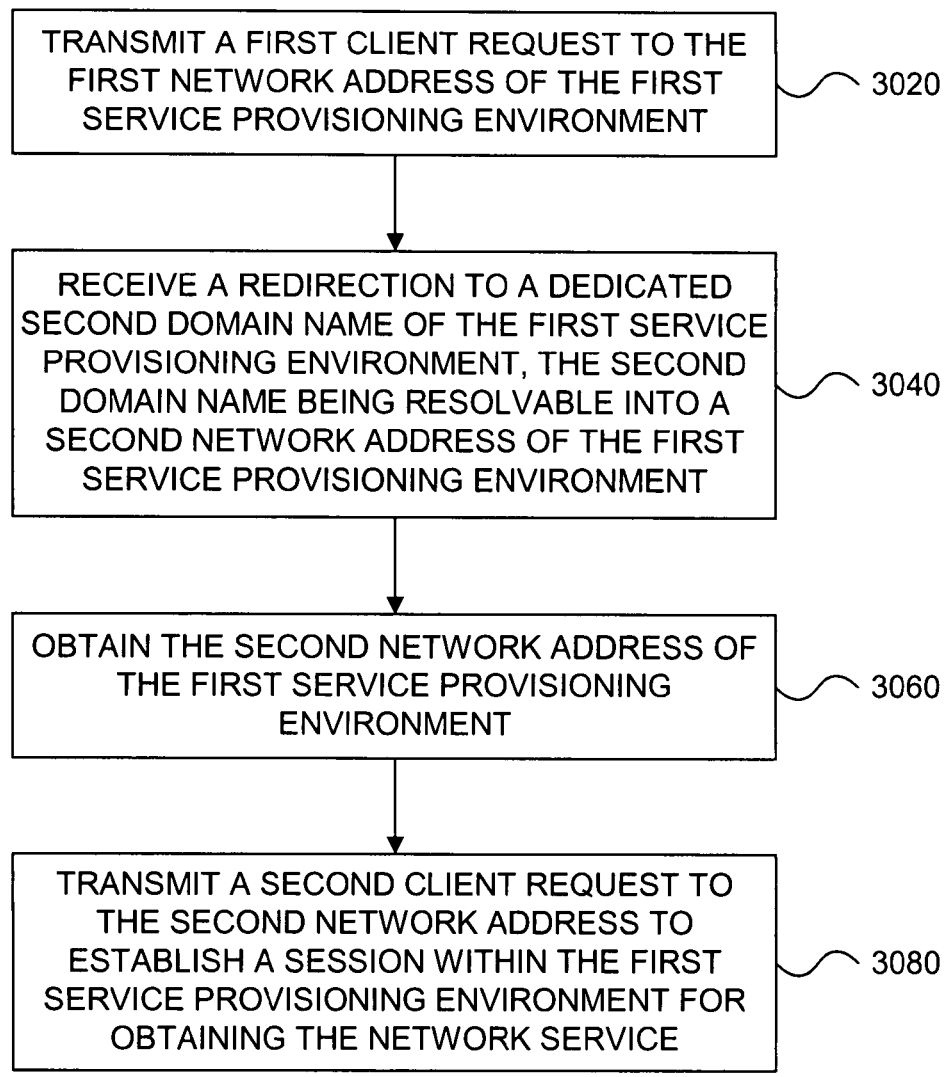

FIG. 3 shows a schematic flow diagram 3000 illustrating the steps performed by a client device, such as the client device 200 shown in FIG. 1, in context with being redirected to a network service in a communications network. The steps illustrated in the flow diagram 3000 can be performed together with the steps shown in flow diagram 2000, of FIG. 2.

In a first step 3020, a first client request is transmitted by the client device to a first network address of a first service provisioning environment of a service provisioning domain. The first service provisioning environment may be configured as shown in FIG. 1 (reference numeral 402) or in any other manner.

The method proceeds with receipt of a redirection command from the first service provisioning environment in step 3040. The redirection command redirects the client device to a dedicated second domain name of the first service provisioning environment, and this second domain name is resolvable into a second network address of the first service provisioning environment.

Then, in step 3060, the client device obtains the second network address of the first service provisioning environment. To this end, a domain name resolution may be performed. Finally, in step 3080, a second client request is transmitted to the second network address of the first service provisioning environment. In response to the second client request, a session for providing the requested network service is established within the first service provisioning environment.

Advantageously, the second domain name obtained in step 3040 is used further on by the client device during any (browser-initiated or user-initiated) subsequent domain name resolution processes during the ongoing session. In other words, the client device may locally associate the established session with the dedicated second domain name of the first service provisioning environment. Any subsequent domain name resolution based on the second domain name of the first service provisioning environment will then always yield the second network address of the first service provisioning environment, and not a network address of any other service provisioning environment that may exist in parallel to the first service provisioning environment in the service provisioning domain. This technique thus helps to ensure that any session-related signalling originating from the client device will always be routed to the ongoing session within the first service provisioning environment.

Figure 4:
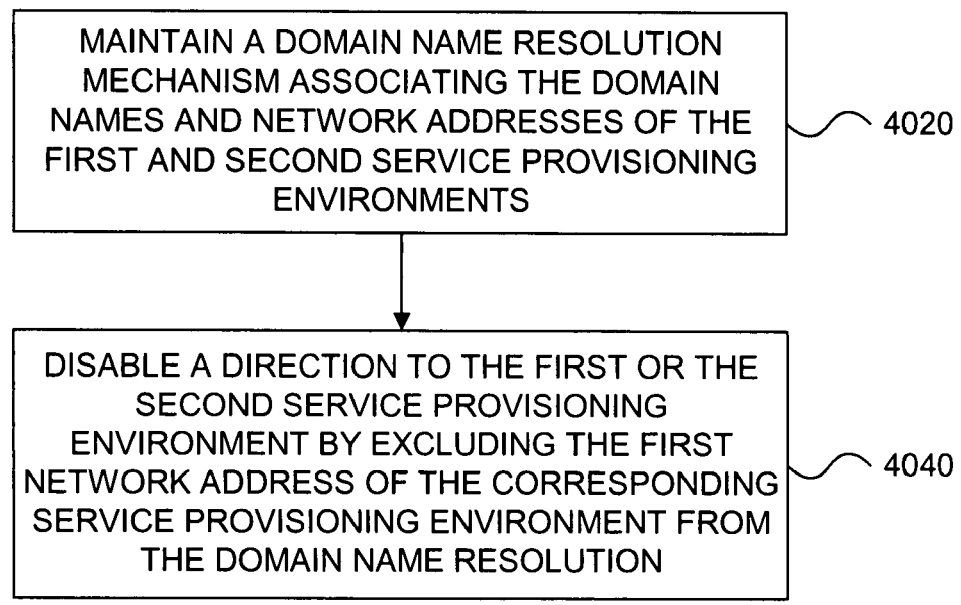

FIG. 4 shows a schematic flow diagram 4000 of a method for directing a client device, such as the client device 200 in FIG. 1, to a network service in a communication network. The method steps illustrated in the flow diagram 4000 may be combined with the method steps illustrated in the flow diagrams 2000 and 3000 of FIGS. 2 and 3, respectively. The method underlying the flow diagram 4000 may be practiced by the domain name resolution device 300 of FIG. 1 or any other device.

The method starts in step 4020 with maintaining a domain name resolution mechanism. This mechanism associates the domain names and network addresses of two or more service provisioning environments and may take the form of a database table. Specifically, the domain name resolution mechanism associates a common first domain name of the multiple service provisioning environments with a dedicated first network address of each service provisioning environment, and a dedicated second domain name of each service provisioning environment with a second network address of the respective service provisioning environment.

In a further step 4040, the method selectively disables a direction to one of the service provisioning environments by excluding the first network address of the corresponding service provisioning environment from domain name resolution. To this end, the specific first network address may simply be deleted, or it may be overwritten by a third network address. The third network address may belong to a mechanism that redirects a requesting client to the common first domain name of the service provisioning environments. Alternatively, or in addition, such a mechanism may delete any state information associating the requesting client with the service provisioning environment for which the first network address has been disabled.

In the following, and with reference to FIGS. 5 to 14, further implementations of redirection techniques in a communication network 500 will be described. Compared to the implementations described above with reference to FIGS. 1 to 4, the following implementations additionally incorporate load balancing schemes and network ser-vice redundancy features. Specifically, a two-layered load balancing mechanism having an upper (global) load balancing layer and a lower (local) load balancing layer will be described. While the global load balancing layer is provided for distributing work-load among (in the non-limiting example) two service provisioning environments, the local load balancing layer is provided in each service provisioning environment for distributing workload among two or more local network servers that may constitute a service provisioning cluster.

In the following examples, the service provisioning environments are set up at geographically spaced-apart sites to ensure that a disastrous event of only local impact will not lead to a complete network service outage (first redundancy aspect). The two service provisioning environments (hereinafter also called service provisioning sites or simply sites) are separated on the network layer (layer 3 in the OSI standard model). Any network breakdown or network misconfiguration in the service provisioning domain will thus typically lead to an outage of only one single site (second redundancy aspect).

Before discussing the various modes of operation of the communication network 500 with reference to FIGS. 5 to 14 in detail, the configurations and tasks of the individual components of the communication network 500 as shown in FIGS. 5 to 8 and 11 to 13 will be explained first.

Figure 5:
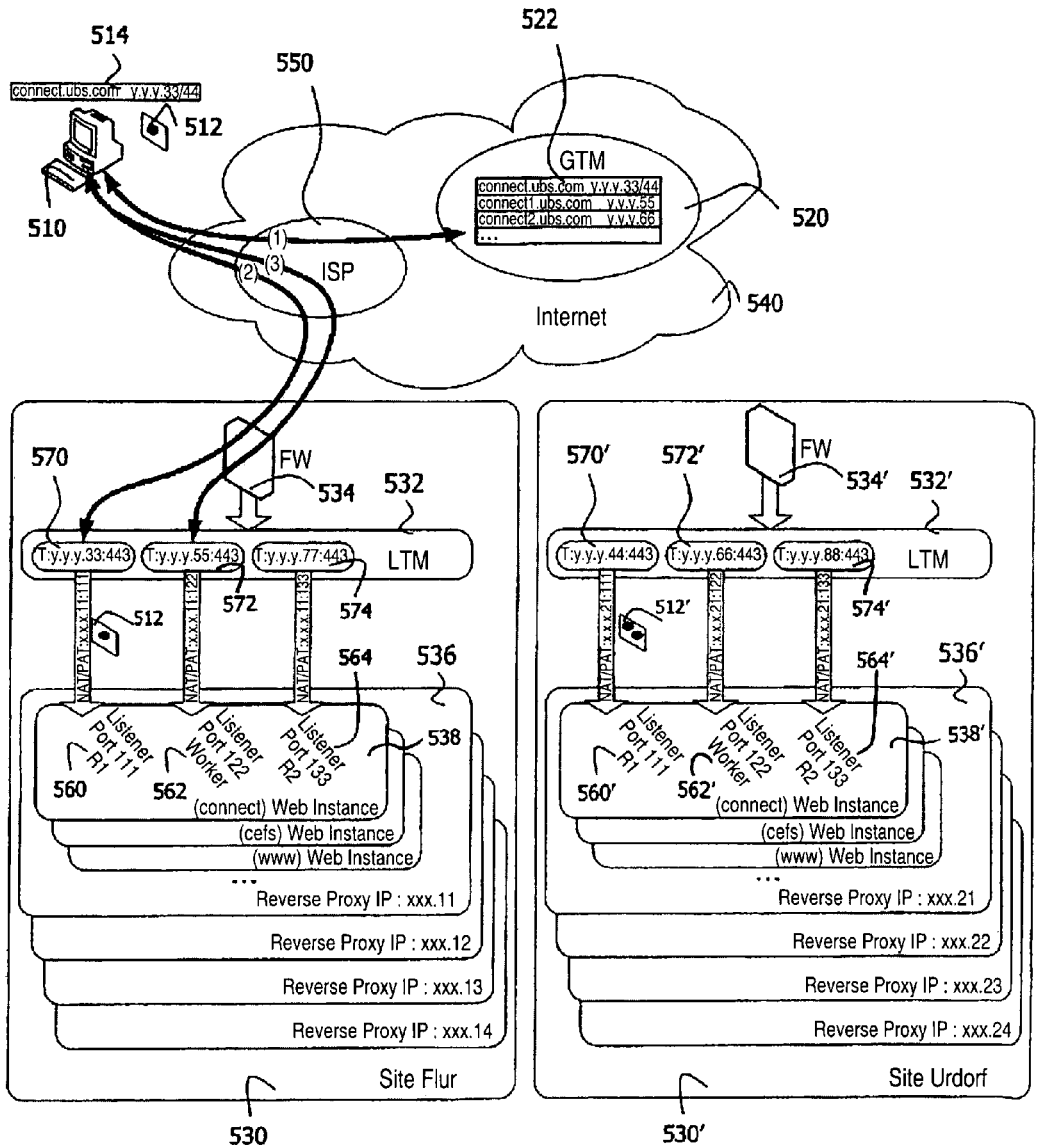
FIGS. 5 to 8 illustrate schematic diagrams illustrating various redirection scenarios in an exemplary communication network.

The main components of the communication network 500 include a client device 510, a domain name resolution mechanism 520 with additional global load balancing (or global traffic management, GTM) functionality, and two service provisioning environments 530, 530' located at geographically space-apart sites called "FLUR" on the one hand and "URDORF" on the other hand. The client device 510, the domain name resolution mechanism 520 and the service provisioning environments 530, 530' communicate with each other via the Internet 540. As shown in FIG. 5, the Internet 540 harbors the domain name resolution mechanism (GTM) 520 as well as an Internet Service Provider (ISP) 550 associated with the client device 510. Any signaling to and from the client device 510 is routed via the IPS 550 as illustrated by the arrows in FIG. 5.

The client device 510 comprises a local storage (not shown) such as a hard disk or a random access memory (RAM) for at least temporarily storing state information. The state information may relate to a site and/or a session during which a network service is, has been or will be obtained. As shown in FIG. 5, the state information includes at least a cookie 512 and table or list 514 for storing address-related information. The content and purpose of the cookie 512 and the table or list 514 will be explained in more detail below.

Turning now to the GTM 520, which may be part of a DNS, this network component has access to a table 522 associating domain names and network addresses of the two service provisioning sites 530, 530'. If additional service provisioning sites are required, the corresponding domain names and network addresses will also be stored in the table 522.

The two service provisioning sites 530, 530' have a similar configuration. As shown for the service provisioning site "FLUR" 530 in FIG. 5, a local load balancer 532 (also called local traffic manager, LTM) 532 is provided that can be reached from the client device 510 via a local firewall 534. The LTM 532 is a layer 2 component and locally routes any client requests to one of several Reverse Proxies (RP) 536. In the scenario shown in FIG. 5, four RPs 536 are provided at each site 530, 530' each RP 536 having its dedicated network address (in the present case, an IP address such x.x.x.11, x.x.x.12, . . . ). Depending on the requirements, more or less RPs 536 could be installed at each site 530, 530'. Each of the RPs 536 is coupled between the LTM 532 and a web server (or web server instance) 538. The four RPs 536 installed at each site 530, 530' thus effectively shield the associated web servers 538 from the client device 510 and any other devices connected to the Internet 540.

Each web server 538 comprises a first redirection listener 560 at port 111, a worker listener 562 at port 122 and a second redirection listener 564 at port 133. The two redirector listeners 560, 564 basically perform redirection tasks, whereas the worker listener 562 is in charge of establishing a session in context with the provision of the network service requested by the client device 510. Each of the listeners 560, 562, 564 of the web server 538 is configured to communicate with a dedicated translator 570, 572, 574 installed on the LTM 532. The translators 570, 572, 574 are each uniquely addressable by a dedicated network address at port 443. In the IP standard, port 443 is reserved for encrypted Secure Socket Layer (SSL) signaling that will penetrate the firewall 534.

The translation tasks of the translators 570, 572, 574 basely comprise Network Address Translation (NAT) and Port Address Translation (PAT) tasks to ensure that a client request received, for example, at the network address y.y.y.33 at port 443 by the translator 570 is forwarded to the network address of a selected one of the RPs 536 at the port of the proper listener. Specifically, in the example shown in FIG. 5, the translator 570 addressable by the client device 510 at the network address/port y.y.y.33:443 of site 530 forwards any client request to the first redirection listener 560 of the web server 538 connected to the first RP 536 at address/port x.x.x.11:111. Moreover, the translator 570 performs a reverse-translation for any signaling received from the first redirection listener 560 and directed to the client device 510. Similar considerations apply to the two remaining translators 572 and 574.

Now that the basic components of the communication network 500 have been generally explained, various operational modes of the communication network 500 will be described in more detail. First, four regular operational modes will be described with reference to FIGS. 5 to 8. In the regular operational mode, it is assumed that all service provisioning sites are available. Then, three further operational modes in connection with a scheduled or unscheduled shutdown of a site will be described with reference to FIGS. 11 to 13.

Turning now to FIG. 5, the signaling in connection with the client device 510 connecting for the first time to the service provisioning domain including the two sites 530, 530' for obtaining a network service will be explained. The requested network service may be an e-banking or any other application that is based on the session paradigm. In the following, a session will be understood as a lasting connection between the client device 510 and a worker instance 562 running on one of the web servers 538. The duration of the connection may range from a few seconds to several hours or longer. The connection will typically be terminated once the requested network service has been provided to the client device 510.

The operational mode illustrated in FIG. 5 starts with a user of the client device 510 typing in the common domain name of the service provisioning domain in the appropriate field of a browser running on the client device 510. Alternatively, the user may activate a predefined link such as a browser bookmark to the common domain name. The common domain name of the service provisioning domain can be interpreted as the common domain name of the two service provisioning sites 530, 530'. In the following, it will be assumed that this common domain name is constituted by the URL "https://connect.ubs.com". It will further be assumed that the network addresses associated with this common domain name are not cached anywhere on the client device 510 or by the ISP 550. Accordingly, the initial state of the client device 510 will be as follows:

| Initial state of the client device in the scenario of FIG. 5 | |
| --- | --- |
| URL | https://connect.ubs.com |
| Site Cookie | None |
| DNS Cache | None |

In a first signalling step (1), the client device requests from the ISP 550 the network address (IP address) of the common domain name "connect.ubs.com". Since the corresponding address is not (yet) cached by the local DNS of the ISP 550, a DNS recurser (not shown) of the client device 510 will finally be directed to the GTM 520.

As becomes apparent from the table 522 locally maintained at the GTM 520, the domain name "connect.ubs.com" is associated with two network address entries, namely y.y.y.33 on the one hand and y.y.y.44 on the other hand. The first network address y.y.y.33 is associated with the site "FLUR" 530 (more specifically with the translator 570 of the LTM 532 of site 530), and the second network address y.y.y.44 is associated with the site "URDORF" 530' (more specifically with the translator 570' of the LTM 532' of site 530'). In other words, the two sites 530, 530' are addressable under the common domain name "connect.ubs.com", and this common domain name is resolvable into a dedicated network address y.y.y.33 of the site "FLUR" 530 and into another dedicated network address y.y.y.44 of the site "URDORF" 530'. The approach of assigning individual network addresses of several sites to a common domain name permits the implementation of a global load balancing mechanism and of redundancy on the site level.

According to a first possibility, global load balancing is performed by the GTM 520, in which case the GTM 520 will return the selected network address of a single one of the sites 530, 530' (i.e. either y.y.y.33 or y.y.y.44) to the DNS recurser of the client device 510. The selection of the specific network address may be based on a round robin scheme, or it may be performed in a random manner. Other alternatives for selecting a network address in context with global load balancing exist also.

According to a second possibility illustrated in FIG. 5, the client device 510 receives from the GTM 520 a list that includes the network addresses of each available site 530, 530'. The client thus receives the two network addresses x.x.x.33 and x.x.x.44 from the GTM 520 and associates both network addresses with the domain name "connect.ubs.com" as becomes apparent from the local client table 514. The selection of a single one of the network addresses associated with "connect.ubs.com" will then be performed on the client device 510 (e.g. according to a round robin scheme or in a random manner or by the user). In the scenario illustrated in FIG. 5, it is assumed that the client device 510 selects the network address y.y.y.33 of the site "FLUR" 530.

In a second signalling step (2) the browser running on the client device 510 is trying to connect to a Hyper Text Transfer Protocol SSL (HTTPS) server at the network address y.y.y.33 and at the SSL port 443. The corresponding signalling is routed by the ISP 550 through the Internet to site 530, where it penetrates the firewall 534 and reaches translator 570 associated with the target address/port y.y.y.33:443.

Upon receipt of the client request in signalling step (2), the LTM 532 performs a local load balancing process and selects a single RP 536 (and an associated web server 538) for processing the client request. The selection performed in this regard by the LTM 532 may be based on any load balancing strategy including round robin and random schemes. In the example illustrated in FIG. 5, the LTM 532 selects RP 536 with network address x.x.x.11. Since the client request is a first request that is not yet associated with an ongoing session and for which no state information is available, the LTM 532 forwards the client request to port 111 of the web server 436 after having performed the required NAT/PAT processes. As stated above, port 111 is associated with the first redirection listener 560.

The first redirection listener 560 has various tasks. A first task comprises maintaining state information to enable a tracking of the client device 510 and of the browser running on the client device 510. To this end, a cookie 512 is set at the client device 510. The cookie 512 references the site "FLUR" 530 as illustrated by a single bullet in FIG. 5. As also becomes apparent from FIG. 5, a corresponding cookie 512' referencing the site "URDORF" 530' will be graphically identified by two bullets (for illustrating purposes only).

In addition to setting the site cookie 512, the first redirection listener 560 redirects the client device 510 to the dedicated domain name "connect1.ubs.com" of the site "FLUR" 530. This redirection can be performed by a HTTP response message including a 3xx redirection status code such as 302 (or in any other way such as by a form-based redirect). In addition to setting the cookie 512, the first redirection listener 560 appends to the URL returned to the client device 510 further state information referencing the site "FLUR" 530 using URL rewriting techniques. Specifically, the URL returned to the client device 510 will look as follows "https://connect1.ubs.com/?trackingsite=FLUR". The appended state information "?trackingsite=FLUR" will in the following be referred to as cookie variable as it will be used in connection with determining whether or not the browser running on the client device 510 provides cookie support. The browser running on the client device 510 may be configured or instructed to mandatorily return both the cookie (if cookie support is provided) and the cookie variable in any subsequent client request.

Once the client device 510 has received the dedicated domain name "connect1.ubs.com" of the site "FLUR" 530 in signalling step (2), the client device 510 will request the network address associated with this domain name. To this end, a further signalling step is performed between the client device 510 and the GTM 520 in a similar way as discussed above with reference to signalling step (1).

Domain name resolution by the GTM 520 based on the content of the table 522 reveals that the network address associated with "connect1.ubs.com" is set to y.y.y.55. In a third signalling step (3) the client device 510 will thus open a connection to y.y.y.55 at SSL port 443 with cookie 512 set to the site "FLUR" 530. The corresponding client request (including the cookie variable and, if cookies are supported, the cookie 512 itself) is received by the translator 572 associated with the network address y.y.y.55 at port 443 at the LTM 532.

The translator 572 will forward the client request according to a local load balancing strategy to the first available RP 536 at port 122. In the scenario shown in FIG. 5, the client request is forwarded to the RP 536 at address x.x.x.11 on port 122. As discussed above, port 122 belongs to worker listener 562, which will then establish an SSL session to provide the requested network service. All future requests and responses exchanged between the client device 510 and the web server instance 538 will be sent over the established SSL session. Once the network service has been provided, the session may be terminated again. Depending on the requirements and settings, the cookie 512 that has been set in signalling step (2) may then either be deleted or deactivated or simply remains unchanged.

Figure 6:
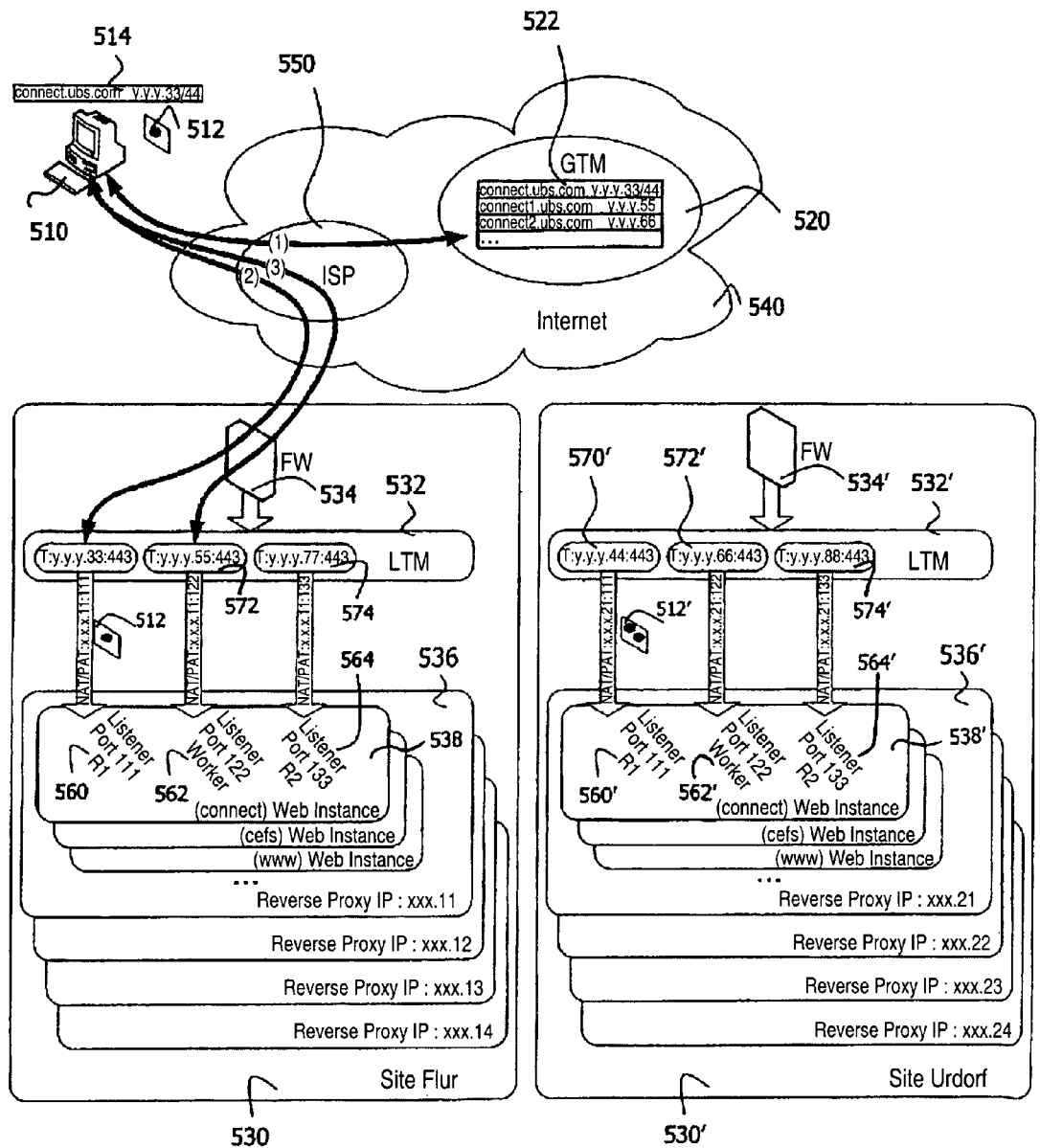

With reference to FIG. 6, a further operational mode of the components of the communication network 500 will be discussed next. The operational mode illustrated in FIG. 6 is a regular operational mode that illustrates the behavior of the network 500 in case a client request is generated from an earlier defined link such as a browser bookmark.

Users typically set up such bookmarks during their sessions in order to generate a shortcut for future use. Any bookmark that has been created earlier by the browser running on the client device 510 during a session that was handled by the site "UR-DORF" 530' will point to the domain name of this site (i.e. to "connenct2.ubs.com"). Alternatively, a user may directly type in the designated domain name "connect2.ubs.com" in the appropriate field of this browser. The initial state of client device 510 will in each case be the following:

| Initial state of the client device 510 in the scenario of FIG. 6 | |
|---|---|
| URL | https://connect2.ubs.com |
| Site Cookie | None |
| DNS Cache | None |

Upon activating the bookmark pointing to "connect2.ubs.com", or upon confirming a corresponding user input, the client device 510 will resolve the network address of the domain name "connect2.ubs.com" to y.y.y.66 during a domain name resolution process involving the GTM 520 and the GTM table 522. The corresponding signalling is similar to signalling step (1) discussed above in context with FIG. 5.

Once the network address y.y.y.66 has been obtained, the client device 510 will connect in a first signalling step (1) to the site "URDORF" 530'. That is, the client device 510 sends a client request via SSL and through the firewall 534' to the translator 572' associated with the network address y.y.y.66 at port 443. The translator 572' first performs NAT/PAT and then forwards the client request to the worker listener 562' running on the web server 538' of a selected RP 536'. The corresponding worker process will first evaluate state information associated with the requesting client device 510 and will thus determine that client device 510 does not yet have a site cookie. The fact that no site cookie is available is an indication that global load balancing has not yet been performed. Therefore, the worker process will, still in signalling step (1), redirect the requesting client device 510 to the common domain name "connect.ubs.com". This redirection ensures global load balancing among all sites 530, 530' even in cases of bookmarks or hard coded site references.

Upon receipt of the redirection command in signalling step (1), the client device proceeds with further signalling steps (2), (3) and (4). In the scenario illustrated in FIG. 6, these three further signalling steps are identical to signalling steps (1), (2) and (3), respectively, discussed above in connection with FIG. 5.

Figure 7:
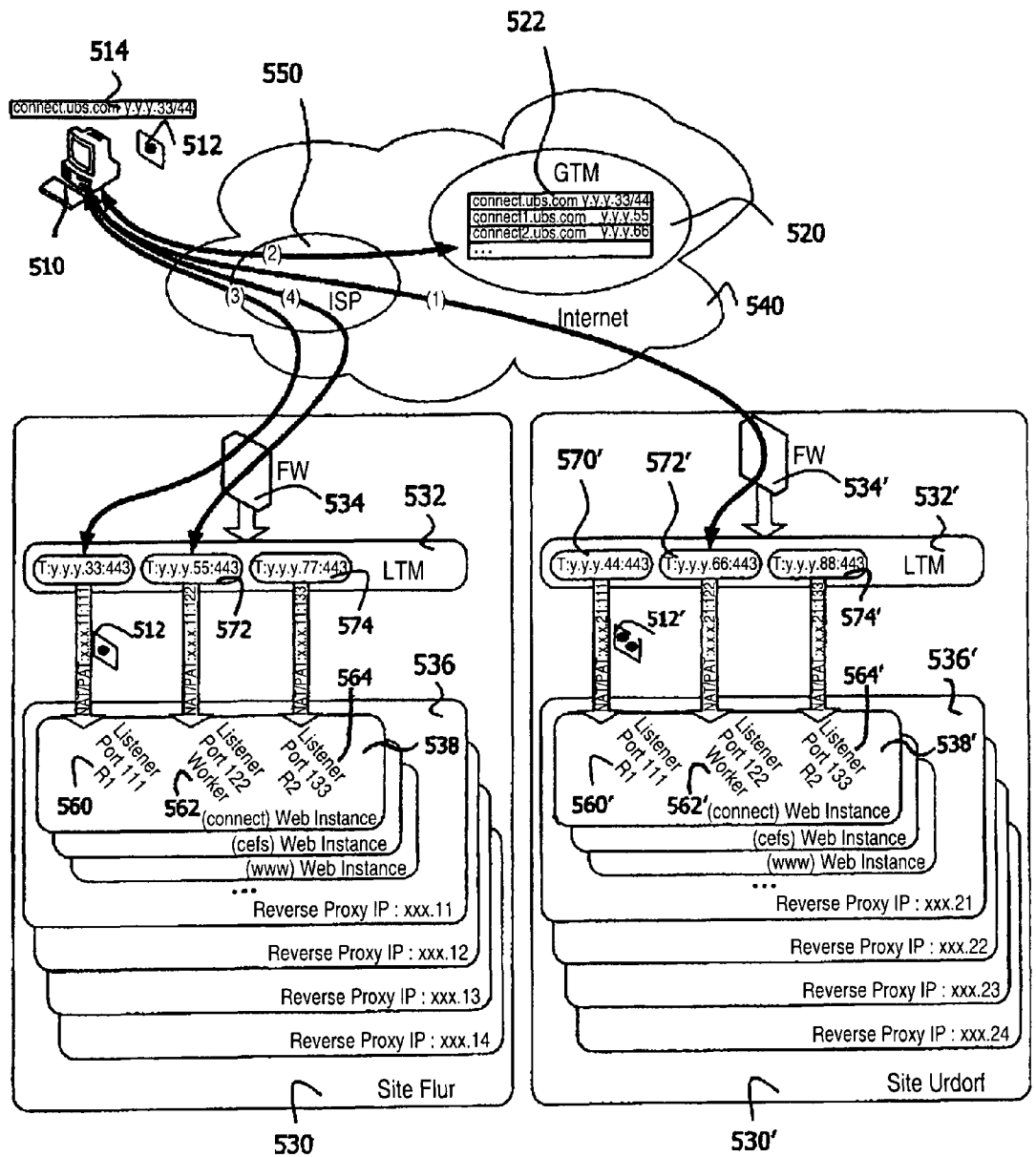

A still further regular operational mode of the components of the communication network 500 will now be discussed with reference to FIG. 7. In this operational mode, it will be assumed that a user opens a bookmarked link to the site "URDORF" 530' while having an ongoing session on the other site "FLUR" 530. Since the client device 510 has an ongoing session with the site "FLUR" 530, a cookie 512 referencing this site has been set. Sessions (signed tokens) are not shared between the two sites 530, 530', and the client device 510 thus needs to be directed from the site "URDORF" 530' to the initial log-in site "FLUR" 530. Otherwise, a new log-in (i.e. a new authentication) would be required, which would surprise the user. The initial state of the client device 510 is shown in the following table:

| Initial state of the client device 510 in the scenario of FIG. 7 | |
|---|---|
| URL | https://connect2.ubs.com |
| Site Cookie | FLUR |
| DNS Cache | None |

When the user activates the link "connect2.ubs.com" to the site "URDORF" 530' during an ongoing session with the site "FLUR" 530, a first signalling step (1) as illustrated in FIG. 7 will be performed. During this first signalling step (1), the client device 510 resolves, with the help of the GTM 520, the network address of "connect2.ubs.com" to y.y.y.66.

In a next signalling step (2), the client connects to the network address y.y.y.66 at SSL port 433. This connection will lead the client device 510 to the worker listener 562' at port 122 of the web server 538' as explained above (signalling step (1) in FIG. 6). The worker listener 562' at port 122 of the site "URDORF" 530' recognizes from the available state information (i.e. from cookie 512) that the requesting client device 510 has an ongoing session at the site "FLUR" 530. Consequently, the worker listener 562' redirects the client device 520 to a worker listener at the site "FLUR" 530 via a resolution of the domain name "connect1.ubs.com". In a third signalling step (3), the client device 510 connects to the appropriate translator 572 at the site "FLUR" 530 and gets forwarded therefrom to the associated worker listener 562 handling the ongoing session.

Figure 8:
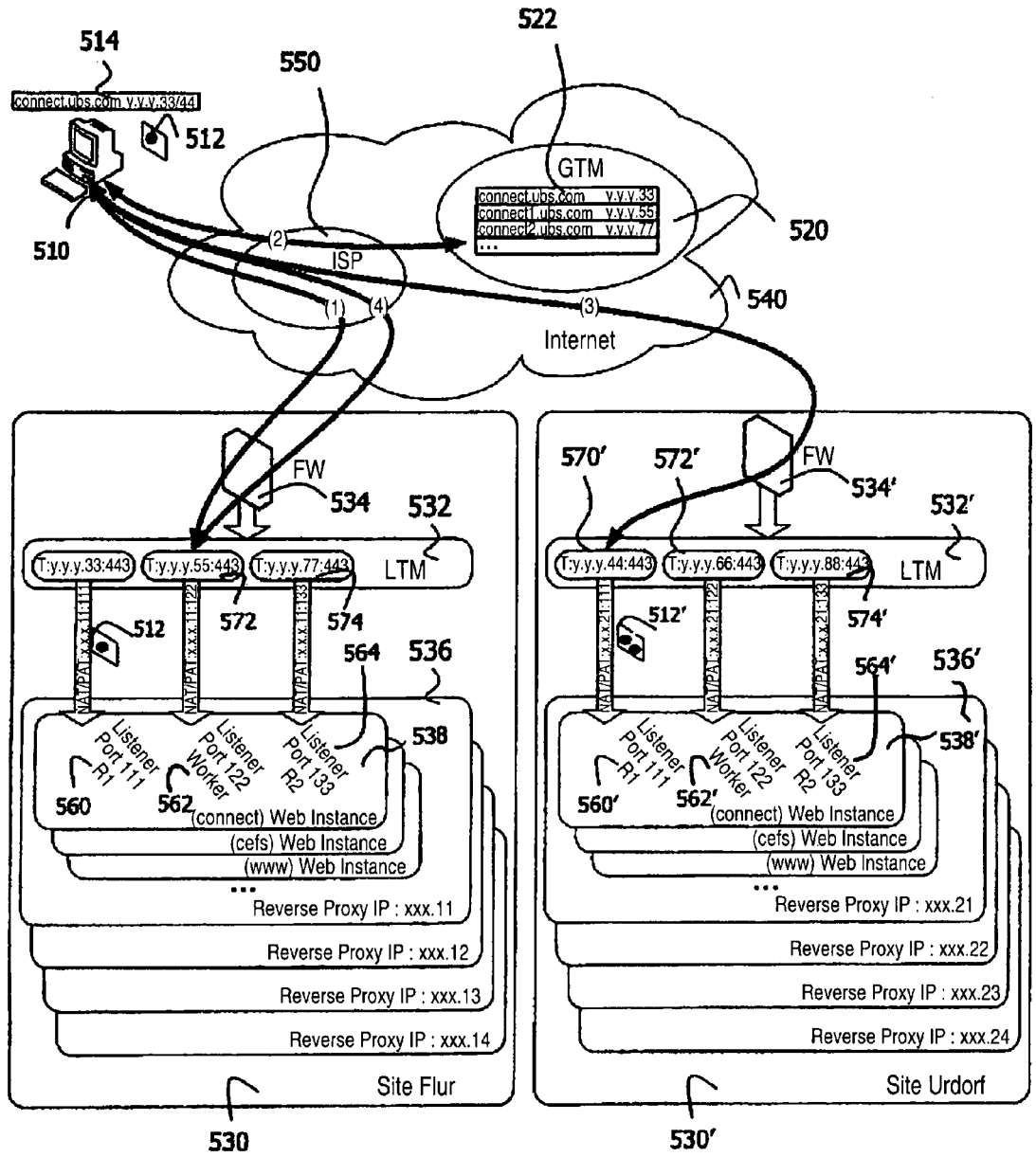

A still further operational mode will now be discussed with reference to FIG. 8. In the scenario shown in FIG. 8, it will be assumed that the client device 510 has a standing session with the site "FLUR" 530 while the user activates a bookmark or any other link pointing to the common domain name "connect.ubs.com". The initial state of the client device 510 is summarized in the table below:

| Initial state of the client device 510 in the scenario of FIG. 8 | |
|---|---|
| URL | https://connect.ubs.com |
| Site Cookie | FLUR |
| DNS Cache | None |

As illustrated in FIG. 8, the client device 510 has a standing session with the site "FLUR" 530 (signalling step (1)) and, during this session, the user activates a link pointing to the common domain name "connect.ubs.com" of the service provisioning sites 530, 530'.

In response to activating the link, the browser of the client device 510 will instruct the GTM 520 to perform a domain name resolution process for "connect.ubs.com". The GTM 520 will return a list including the two network addresses x.x.x.33 and x.x.x.44 as explained earlier.

It will now be assumed that the client device selects the x.x.x.44 address. In this case, the client device 510 will be directed in a third signalling step (3) to the first redirector listener 560' of the site "URDORF" 530'. The first redirector listener 560' will evaluate if any state information is available and will thus determine, based on the cookie 512, that the client device 510 has an ongoing session with the site "FLUR" 530. The first redirector listener 560' thus redirects the client directly to "connect1.ubs.com" (and thus to the corresponding worker process at the site "FLUR" 530). After an optional domain name resolution process, the client device 510 in a fourth signalling step (4) connects back to his original worker process 562.

The redirection logic of the first redirection listeners 560, 560' discussed above with reference to the network scenarios of FIGS. 5 to 8 will now be described in more detail based on the schematic flow diagram illustrated in FIG. 9.

Figure 9:
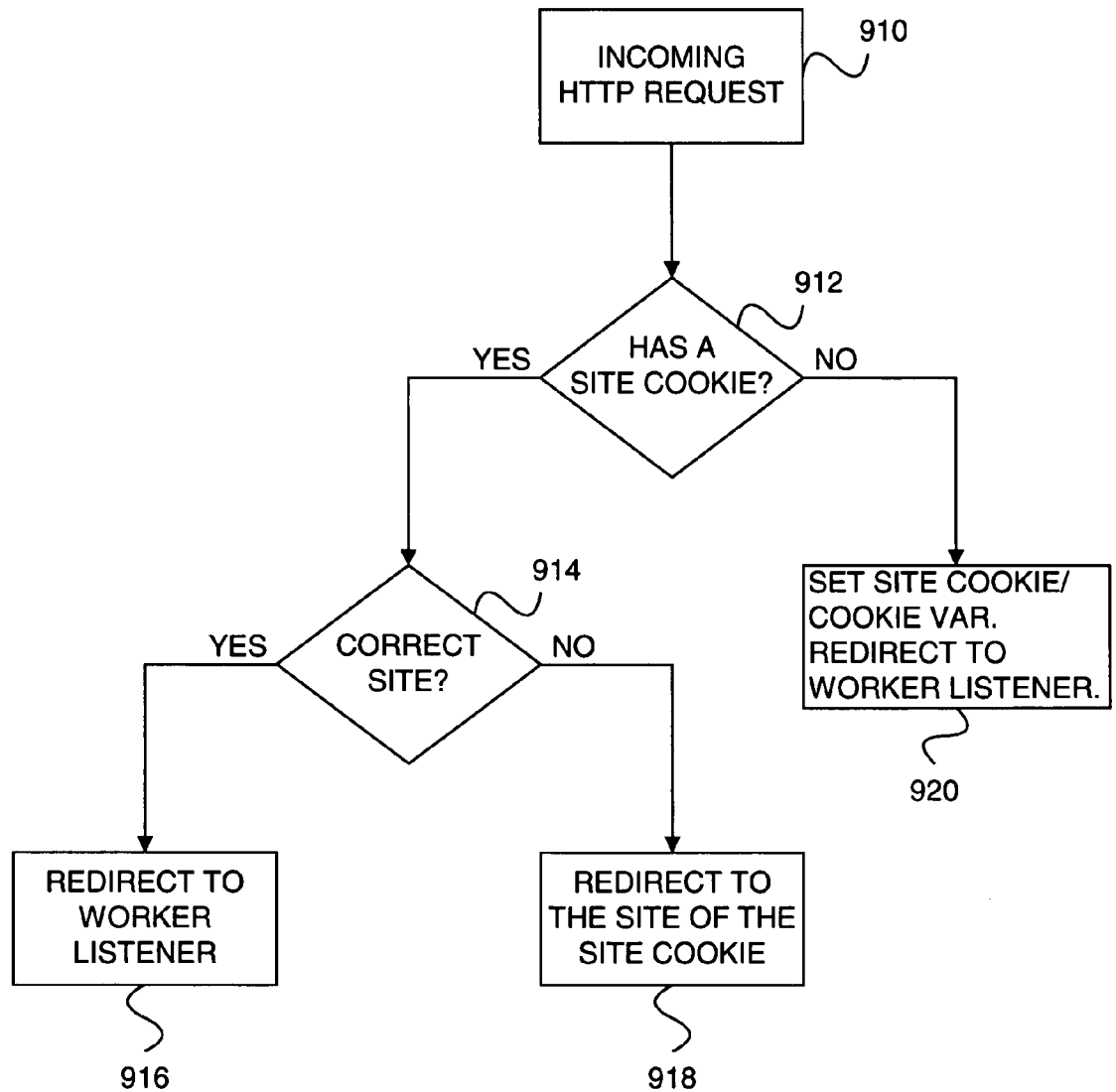
FIGS. 9 and 10 illustrate flow diagrams depicting a first and a second redirection logic.

As shown in FIG. 9, the redirection logic of the first redirection listener 560, 560' is triggered by receipt of an incoming HTTP client request (step 910). In a next step 912, the first redirection listener 560, 560' determines if state information is available for the requesting client device 510. In the present example, the state information is maintained in the form of a cookie 512 referencing a particular one of the two ser-vice provisioning sites 530, 530'.

If it is determined in step 912 that a cookie 512 is actually available, the redirection logic proceeds with step 914 and determines if the first redirection listener 560, 560' processing the incoming client request belongs to the specific service provisioning site 530, 530' referenced in the cookie 512. If this determination in step 914 results in the finding that the client request has reached the correct site, the redirection logic proceeds with step 914 and redirects the client device 510 to the worker listener 562, 562' of the local site.

If, on the other hand, the determination performed step 914 yields the result that the cookie references a site different from the site in which the client request is evaluated, the redirection process continues with step 918 and redirects the requesting client device 510 to the specific site referenced in the cookie.

If the first redirection listener 560, 560' determines in step 912 that no cookie is available, the redirection process continues with step 920. In step 920, a site cookie 512 is set and, additionally, a cookie variable is set by writing a site reference in the redirection URL as discussed above. Moreover, the requesting client device 510 is redirected to the local worker listener 562, 562' of the present site 530, 530'. This situation corresponds to the scenario shown in FIG. 5.

Figure 10:
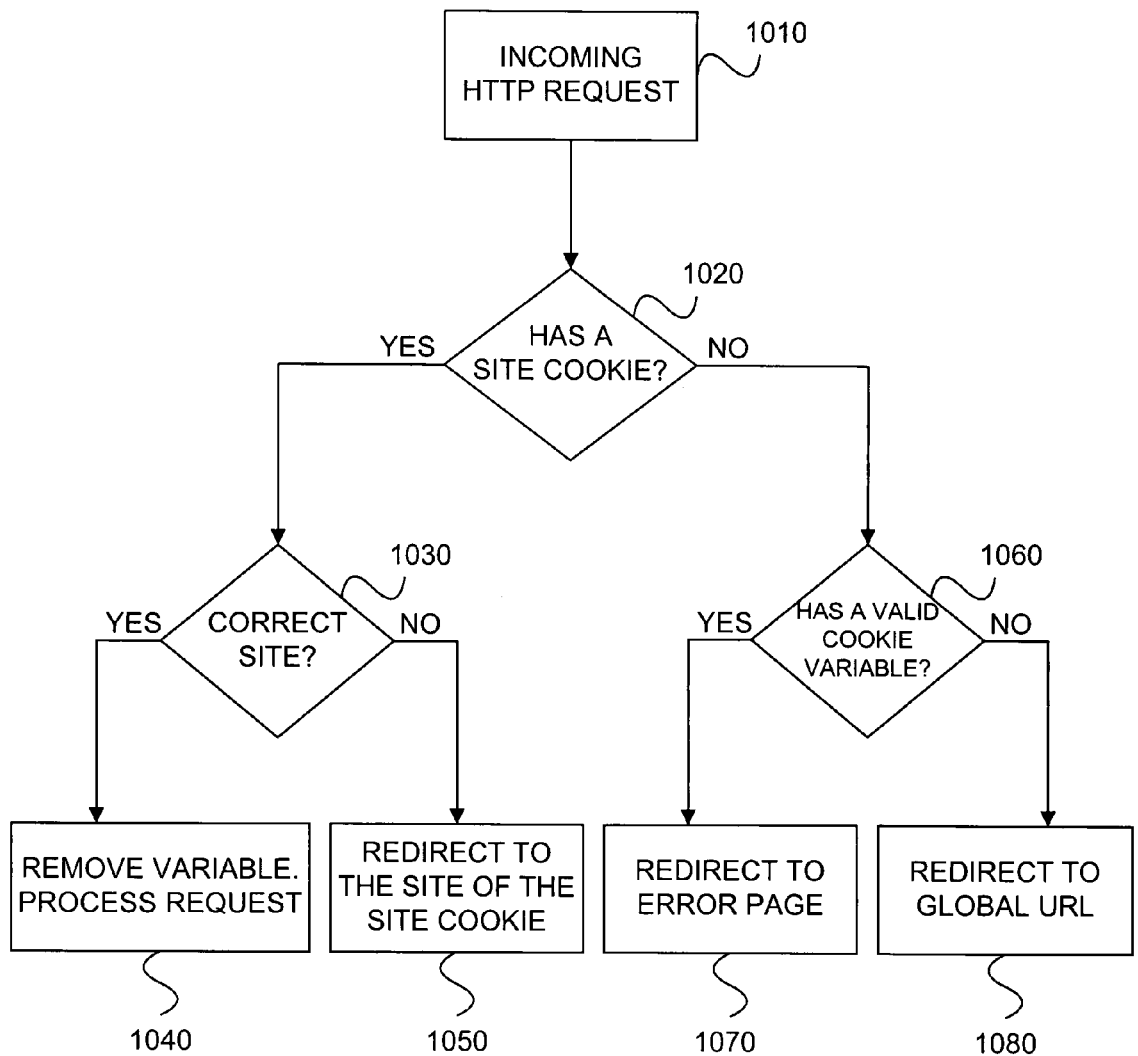

FIG. 10 illustrates the redirection logic of the worker listener 572, 572' as implemented, for example, in the network scenarios of FIGS. 5 to 8.

Again, the redirection process starts with the receipt of an incoming HTTP client request by the worker listener 562, 562' of one the sites 530, 530' (step 1010). In a next step 1020, it is determined if state information (i.e., a cookie 512) is available for the requesting client device 510. If a cookie 512 is available, it is determined in a next step 1030 if the cookie 512 references the site of the specific worker listener 562, 562' processing the client request. If, based on evaluation of the cookie, it is determined in step 1030 that the cookie 512 references the correct site 530, 530', the cookie variable is removed and the client request is forwarded to a specific application and processed in a next step 1040. Otherwise (i.e. in case the cookie 512 references another site) the redirection process continues with redirecting the client device 510 to the site referenced in the cookie 512 (step 1050). This redirection result corresponds to the scenario illustrated in FIG. 7.

If it is determined in step 1020 that no state information is available, it is determined in a next step 1060 if the requesting client device 510 has a valid cookie variable (i.e., references the correct site 530, 530'). If a valid cookie variable can be found in step 1060, the redirection process continues with a redirection to an error page in step 1070. The error page requests the user of the client device 510 to activate the cookie support feature of his/her browser. In this regard, the fact that no cookie is returned while the request is accompanied by a valid cookie variable is interpreted as an indication that cookie support has been disabled at the client site. If no valid cookie variable can be determined in step 1060, the client device 510 is redirected in step 1080 to the common domain name of the sites 530, 530' (i.e. to the global URL "https://connect.ubs.com") for starting the process shown in FIG. 5.

Having discussed regular modes of operation with reference to FIGS. 5 to 10 above, in the following some further operational modes of the components of the network 500 in case one site has been or will be taken out of service will be discussed in relation to FIGS. 11 to 14. There are various reasons why a specific site 530, 530' has been or will be taken out of order. Such reasons include a hardware failure on a network level, scheduled maintenance work such as software updates, and so on.

Figure 11:
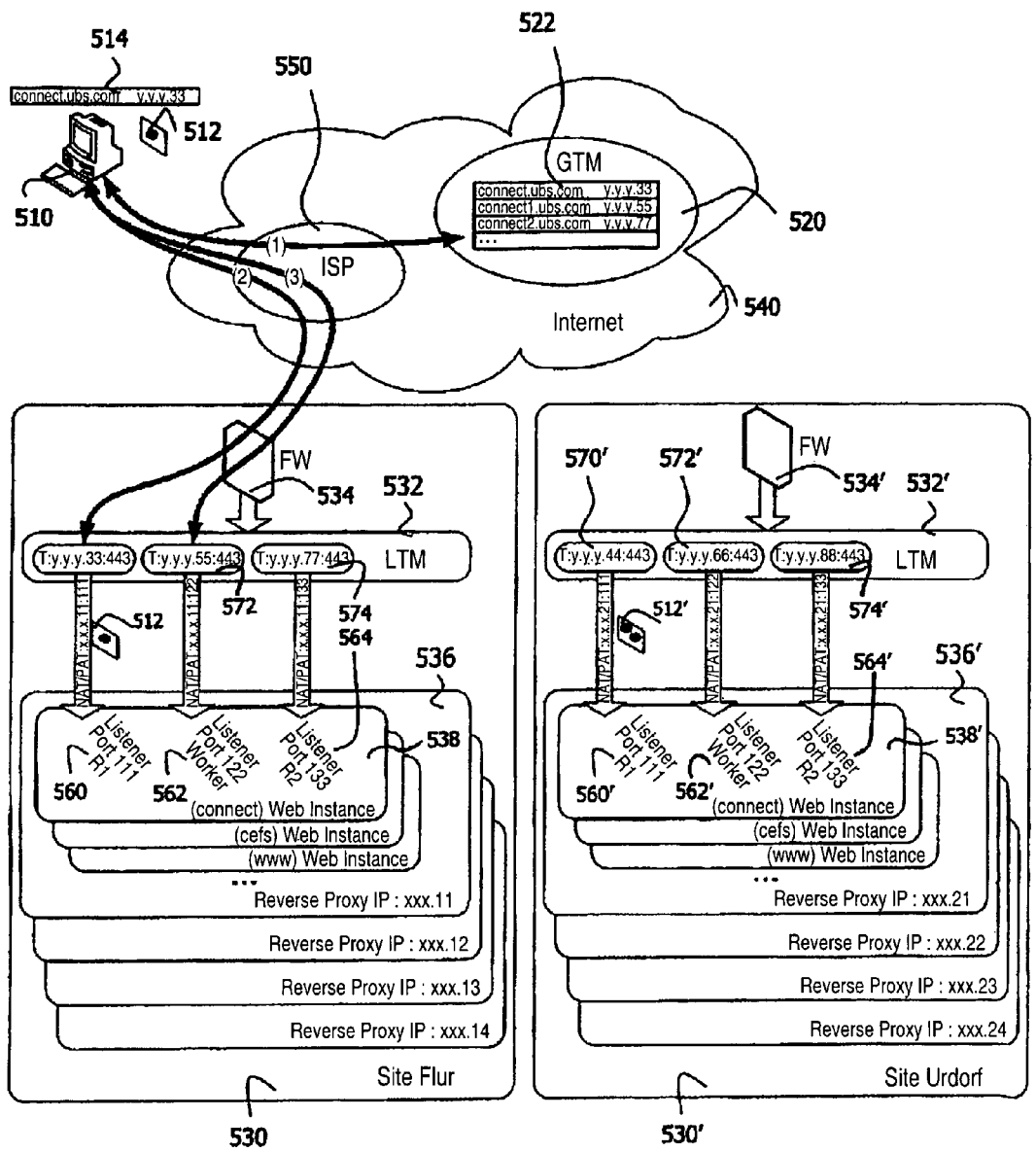
FIGS. 11 to 13 illustrate schematic diagrams illustrating further redirection scenarios in an exemplary communication network.

With reference to FIG. 11, it will be assumed that the site "URDORF" 530' has been taken out of service some time ago. In order to prevent that global load balancing will still direct any requesting client 510 to the site 530' taken out of service, the domain name resolution table 522 of the GTM 520 has been updated accordingly by excluding the network address y.y.y.44 from global domain name resolution. This can be done by deleting or blocking the corresponding network addresses in the table 522. The scenario illustrated in FIG. 11 is similar to the first connection scenario shown in FIG. 5 with the exception of the reconfigured GTM 520.

The initial state of the client device 510 is shown in the following table.

| Initial state of the client device 510 in the scenario of FIG. 11 | |
|---|---|
| URL | https://connect.ubs.com |
| Site Cookie | None |
| DNS Cache | None |

Referring to FIG. 11, the signalling starts with a first signalling step (1) in which the client device 510 requests the network address corresponding to the common do-main name "connect.ubs.com". The first signalling step (1) is performed in a similar manner as the first signalling step (1) shown in FIG. 5 with the exception that the GTM 522 returns only a single network address, namely the network address y.y.y.33 of the site "FLUR" 530. The client device 510 will thus automatically be directed to the site "FLUR" 530 still in service and has no possibility of selecting the other site "URDORF" 530' compared to the scenario of FIG. 5.

In a more general case it may be assumed that N service provisioning sites have been set up and that a single one of these N service provisioning sites has been taken out of service. In such a case, the table 522 of the GTM 520 will include N-1 network address entries for the common domain name "connect.ubs.com". Consequently, the GTM 520 will return N-1 network addresses to the requesting client device 510 to enable the selection of a specific site. Alternatively, the selection among the N-1 network addresses could of course also be performed by the GTM 520.

Returning to FIG. 11, and after receipt of the network addresses y.y.y33 from the GTM 520, the client device 510 initiates a second signalling step (2) that will result in a redirection as illustrated by signalling step (3). Signalling steps (2) and (3) of FIG. 11 then correspond to signalling steps (2) and (3) of FIG. 5.

Figure 12:
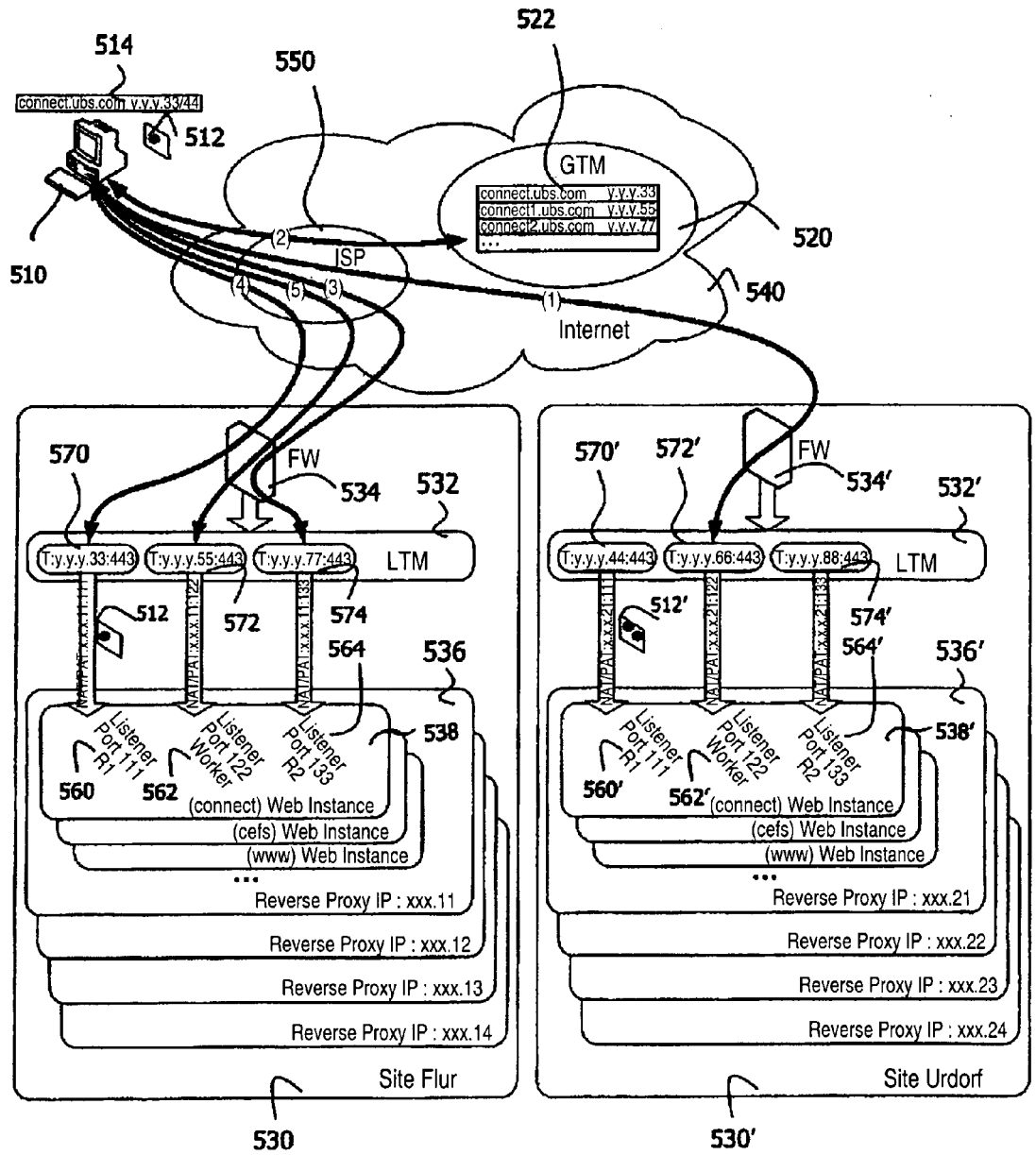

An additional operational mode illustrated in FIG. 12 corresponds to a graceful take-over from the site "URDORF" 530' to the site "FLUR" 530 during an ongoing session. It will be assumed that the site "URDORF" 530' is about to be shut down for maintenance purposes. Therefore, the GTM 520 has already been reconfigured to point only to the site "FLUR" 530 as explained above in connection with FIG. 11.

In the case of the graceful shutdown as illustrated in FIG. 12, the LTM 532' effected by this shutdown will wait until all connections have been transferred to another site 530. The actual shutdown of the site 530' will only be triggered when there are no more client devices 510 connected to this site 530'. The initial state of the client device 510 is shown in the following table:

| Initial state of the client device 510 in the scenario of FIG. 12 | |
|---|---|
| URL | https://connect2.ubs.com |
| Site Cookie | URDORF |
| DNS Cache | CONNECT2 -> URDORF |

Referring to FIG. 12, signalling step (1) indicates that the client device 510 has a standing session and is logged in at the site "URDORF" 530'. During the ongoing session, the GTM 520 has been reconfigured to point only to the site "FLUR" 530 due to an imminent shutdown of the site "URDORF" 530'. The reconfiguration of the GTM 520 concerns two entries in the GTM table 522. First, the network address y.y.y.44 of the site "URDORF" 530' will be removed or blocked so that a resolution of the common domain name "connect.ubs.com" will not direct the client 510 to the site "URDORF" 530'. Moreover, the network address associated with the designated domain name "connenct2.ubs.com" of the site "URDORF" 530' will be changed such that it directs the client device 510 (via the translator 574) to the second redirection listener 564 of the site "FLUR" 530.

When the local cache at the client device 510 expires, the browser installed on the client device 510 will automatically trigger a new domain name resolution process. Since the client device 510 has an ongoing session with the site "URDORF" 530' under the designated domain name "connect2.ubs.com", domain name resolution will return the network address y.y.y.77 to the client device 510 in signalling step (2).

The network address y.y.y.77 returned in signalling step (2) will direct the client device 510 to the second redirection listener 564 of the site "FLUR" 530 as indicated by signalling step (3). As the client device 510 connects to the site "FLUR" 530 with the (wrong) cookie 512 referencing the site "URDORF" 530', the second redirection listener 564 will perform some dedicated tasks. A first task includes a deletion of all state information (including cookies) associating the client device 510 with the site "URDORF" 530' that has to be taken out of service. An optional second task redirects the client device 510 to the common domain name "connect.ubs.com" to ensure a workload distribution in case of a service provisioning domain including three or more service provisioning sites. In the two-site scenario of FIG. 12 such a redirection is not mandatory, so that the second redirection listener 564 may set a cookie 512 referencing the site "FLUR" 530 and redirect the client device 510 directly to "connect1.ubs.com", i.e. to the first redirection listener 560. Additionally, the second redirection listener 564 may trigger the display of an information message on a monitor of the client device 510 to inform the user about the ongoing redirection process (as a new authentication may be required).

Due to the redirection to "connect1.ubs.com", the client device 510 will in a next signalling step (4) contact the first redirection listener 560. The first redirection listener 560 will redirect the client device 512 to the local worker listener 562 as explained above in connection with the signalling steps of (2) and (3) of FIG. 5.

In a final signalling step (5), the client device 510 connects to the worker instance 562 on the web server 538 of the site "FLUR" 530. There, the client device 510 will have to log-in again (new authentication) because the log-in context (site token) is not shared between the sites 530, 530'.

Figure 13:
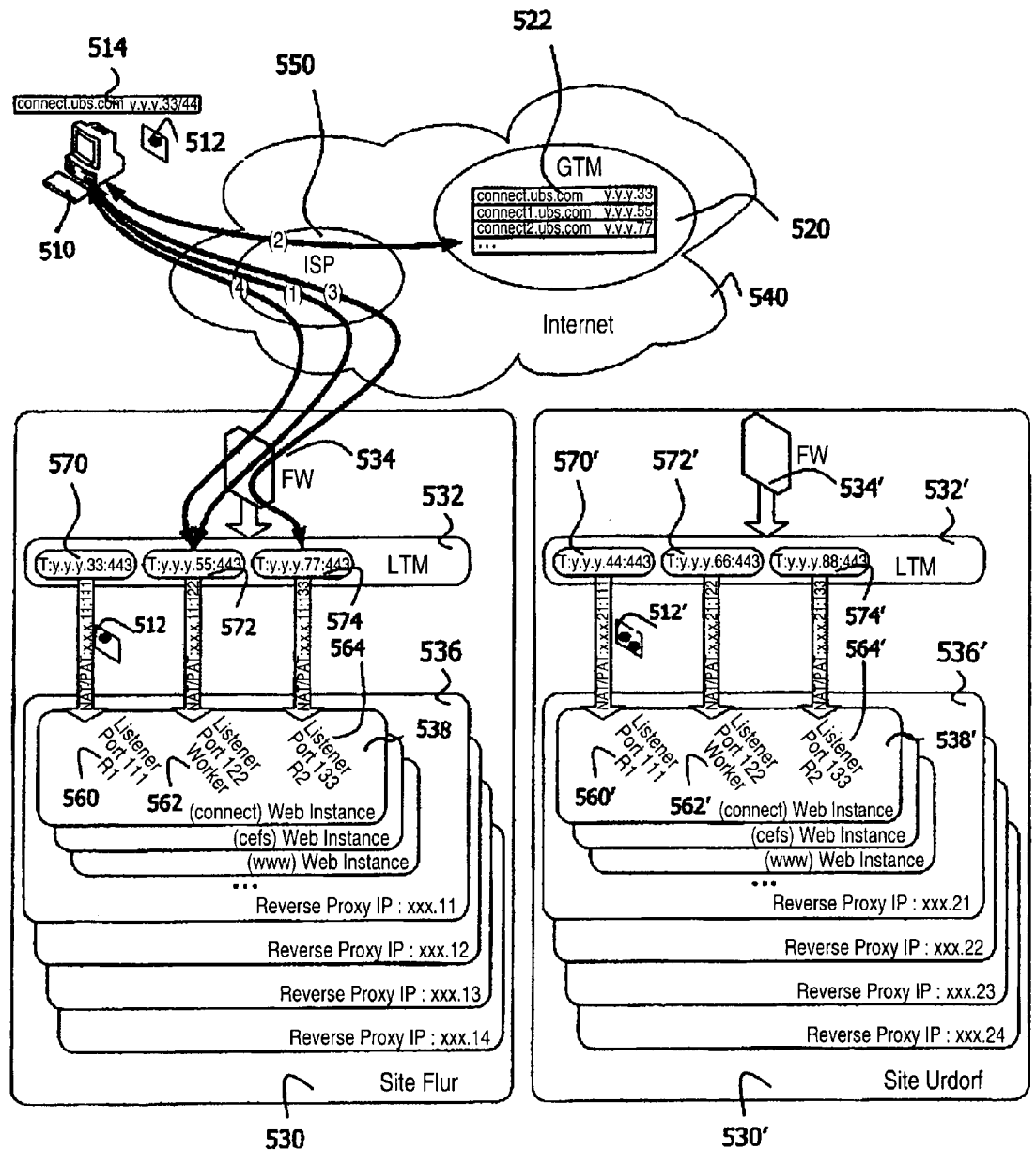

In another operational mode of the components of the communication network 500 shown in FIG. 13 it will be assumed that the client device 510 activates a link to a site 530' that has been taken out of service while the client device 510 has an ongoing session on another site 530. The GTM table 520 has previously been reconfigured as discussed in context with FIG. 12. The initial state of the client device 510 will thus be as follows.

| Initial state of client device 510 in the scenario of FIG. 13 | |
| --- | --- |
| URL | https://connect2.ubs.com |
| Site Cookie | FLUR |
| DNS Cache | None |

As illustrated by signalling step (1) in FIG. 13, the client device 510 is connected to and has an authenticated session with the site "FLUR" 530. During this session, the user activates a link to the designated domain name "connect2.ubs.com" of the site "URDORF" 530' that has been taken out of service.

In a second signalling step (2) the GTM 520 resolves "connect2.ubs.com" into the network address x.x.x.77. The network address x.x.x.77 directs the client device 510 to the second redirection listener 564 via translator 574. This is illustrated by signal-ling step (3). The second redirection listener 564 evaluates the state information (i.e. the cookie 512) associated with the requesting client device 510 and thus determines that the client device 510 has an ongoing session at the site "FLUR" and a valid session context. The second redirection listener 564 will thus redirect the client device 510 directly to the local worker listener 562 at "connect1.ubs.com". In a fourth signalling step (4), the client device 510 thus connects with his existing session context to the worker listener 562 to continue the ongoing session.

Figure 14:
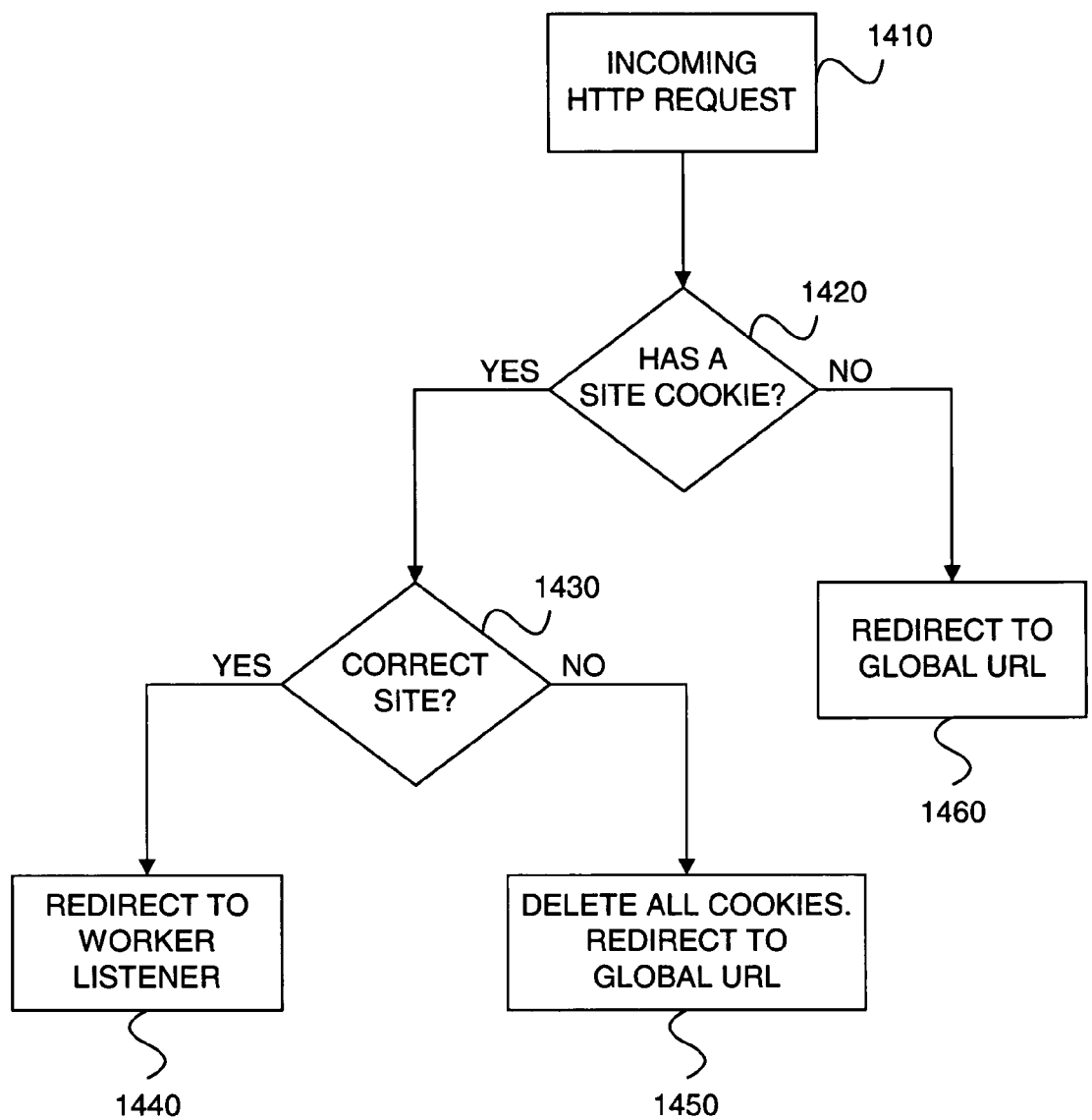
FIG. 14 illustrates a flow diagram depicting a third redirection logic.

The redirection logic of the second redirection listener 564, 564' will now be described in more detail with reference to the schematic flow diagram of FIG. 14.

The redirection process starts, in step 1410, with receipt of an incoming HTTP client request by the second redirection listener 564, 564'. In a next step 1420 is deter-mined if state information (i.e. a cookie 512) is available for the requesting client device 510.

If such state information is available, it is determined in the next step 1430 if the state information references the particular site of the second redirection listener 564, 564' or a wrong site. In the case the correct site is referenced, the redirection process continues with step 1440, and the client device 510 is redirected to the local worker listener 562, 562'. This scenario has been discussed above with reference to FIG. 13.

If, on the other hand, the second redirector listener 564, 564' determines that the cookie 512 references another site, the redirection process continues with step 1450. In step 1450, all cookies are deleted and the requesting client device 510 is redirected to the common domain name of the service provisioning sites 530, 530' (i.e. to the global URL "connect.ubs.com") to ensure that a global load balancing is performed. This basically corresponds to the scenario discussed above with reference to FIG. 12.

According to another possibility, it may be determined in step 1420 that no state information is available for the requesting client device 510 (i.e. that no cookie 512 has been set). In this case, the redirection process continues with step 1460 and with a redirection to the common domain name "connect.ubs.com" for a global load balancing.

The scenarios discussed above in combination with FIGS. 11 to 14 basically concern a graceful (scheduled) shutdown. In the case of unscheduled shutdowns (for example due to network failures or disastrous events) similar measures can be initiated taking into account the following. First, there will be a latency between the shutdown and the reconfiguration of the GTM 520 compared to the graceful shutdown. This means that the shutdown will occur first and the GTM reconfiguration can only happen afterwards. This will result in a non-transparent outage for a certain percentage of the client devices which happen to be redirected in this latency window to the faulty site. Moreover, abrupt shutdown of a site will result in an outage for all client devices currently connected to the site. This could imply that at least some of the client de-vices might have to restart their browsers and require re-authentication.

The redirection in cases of scheduled and unscheduled site outages occurs via a reconfiguration of the GTM table 522 and, more specifically, of the DNS entries included therein. DNS entries changed on the GTM 520 will have to be propagated through the Internet 540 to the client device 510. Any caching on the way from the GTM 520 to the client device 510 (such as in the DNS of the ISP 550) will slow down the whole propagation process. Therefore, the validity period of the DNS response should be set to a minimum value.

State information such as cookies and cookie variables is not only helpful to implement the redirection logic, but it may also be an important factor for tracking established sessions such as e-banking or electronic purchase sessions. Basically, there are three methods to preserve state information in the form of a "session state" in a HTTPS session, namely the SSL session ID, the session number in the URL (URL-rewrite) and the setting of a session cookie. The use of the SSL session ID may not work in cases in which client devices sit behind an SSL RP, which is re-using sessions. The use of a session number in the URL is not transparent to the end users and is stored in the browsing history (which can be undesirable in some cases).

In summary, the use of session cookies, in combination with URL rewriting for detecting cookie support, might often be a good solution not only for redirection control but also for session tracking. For this reason, it may be desirable to trap client devices with no cookie support with a redirection to a corresponding error page as illustrated by block 1070 in FIG. 10. The trapping may be implemented in a "site cookie setting filter" as follows: if no valid cookie is available, the first redirector 560, 560' not only sets a site cookie, but also writes the cookie in the redirection URL (cookie variable) as shown in box 920 of FIG. 9.

Having thus described various examples in more detail, it will be recognized that such detail need not be strictly adhered to but that various changes and modifications may suggest themselves to one skilled in the art, all falling within the scope of the invention as defined by the attached claims.

What is claimed is:

1. A method of redirecting a client device to a network service in a communication network, wherein the communication network includes at least a first and a second service provisioning environment each capable of providing the network service, the first and second service provisioning environments being addressable under a common first domain name resolvable into a first network address of each service provisioning environment, the method comprising the following steps that are carried out in the first service provisioning environment:
   receiving a first client request at the first network address of the first service provisioning environment;
   responding to the first client request with a redirection to a dedicated second domain name of the first service provisioning environment, the redirection being signaled to the client device and the second domain name being resolvable into a second network address of the first service provisioning environment;
   receiving a second client request at the second network address of the first service provisioning environment; and
   initiating the establishment of a session with the requesting client device to provide the network service.

2. The method of claim 1, further comprising:
   maintaining state information associating the requesting client device with the first service provisioning environment.

3. The method of claim 2, wherein,
   maintaining the state information comprises setting a cookie at the requesting client device, the cookie referencing the first service provisioning environment.

4. The method of claim 2, wherein,
   maintaining the state information comprises appending the state information to the dedicated second domain name of the first service provisioning environment transmitted to the client device.

5. The method of claims 3, further comprising:
   receiving at least one of the cookie and the appended state information together with the second client request and, based thereon, determining if the client device provides cookie support.

6. The method of claim 2, further comprising the following steps that are performed in the second service provisioning environment:
   receiving an initial client request at a second network address of the second service provisioning environment, the second network address being resolvable from a dedicated second domain name of the second service provisioning environment;
   evaluating, if available, the state information associating the requesting client device with one of the service provisioning environments; and
   handling the initial client request depending on the evaluation.

7. The method of claim 6, further comprising:
   determining, during the evaluating, that no state information is available, and redirecting the client device during the handling to the common first domain name of the first and second service provisioning environments.

8. The method of claim 6, further comprising:
   determining, during the evaluating, that the client device is associated with the first service provisioning environment, and redirecting the client device during the handling to the dedicated second domain name of the first service provisioning environment.

9. The method of claim 2, further comprising the following steps that are performed in the second service provisioning environment:
   receiving an initial client request at the first network address of the second service provisioning environment;
   determining from the state information that the requesting client device is associated with the first service provisioning environment; and
   responding to the initial client request with a redirection to the dedicated second domain name of the first service provisioning environment.

10. The method of claim 1, further comprising:
    maintaining a domain name resolution mechanism associating the domain names and the network addresses of the first and second service provisioning environments.

11. The method of claim 10, further comprising:
    blocking a redirection to the first or the second service provisioning environment by excluding the first network address of the corresponding service provisioning environment from domain name resolution.

12. The method of claim 10, further comprising:
    blocking a redirection to the first or the second service provisioning environment by replacing the second network address of the corresponding service provisioning environment with a third network address of a service provisioning environment not blocked from redirection.

13. The method of claim 12, wherein,
    the third network address belongs to a mechanism that deletes, in response to a client request of a client device having or requesting a session in the service provisioning environment blocked from redirection, state information associating the requesting client device with this service provisioning environment.

14. The method of claim 12, wherein,
    the third network address belongs to a mechanism that redirects, in response to a client request of a client device having or requesting a session in the service provisioning environment blocked from redirection, the requesting client device to the common first domain name of the service provisioning environments.

15. The method of claim 14, wherein,
    the first client request is received in response to the redirection to the common first domain name.

16. The method of claim 10, wherein,
the domain name resolution mechanism directs each incoming resolution request for the common first domain name to the first network address of a single service provisioning environment that has been selected according to a global load balancing strategy.

17. The method of claim 10, wherein,
the domain name resolution mechanism responds to each incoming resolution request for the common first domain name with a list of the first network addresses for enabling a selection of the first network address of a single service provisioning environment by a global load balancing strategy on a client side.

18. The method of claim 1, wherein,
each service provisioning environment includes a service provisioning cluster of two or more servers each capable of providing the requested service.

19. The method of claim 18, wherein,
each service provisioning environment includes a local load balancing mechanism for performing load balancing among two or more servers of a service provisioning cluster.

20. A method of redirecting a client device to a network service in a communication network, wherein the communication network includes at least a first and a second service provisioning environment each capable of providing the network service, the first and second service provisioning environments being addressable under a common first domain name resolvable into a first network address of each service provisioning environment, the method comprising the following steps that are carried out by the client device:
transmitting a first client request to the first network address of the first service provisioning environment;
receiving a redirection to a dedicated second domain name of the first service provisioning environment, the redirection being signaled to the client device and the second domain name being resolvable into a second network address of the first service provisioning environment;
obtaining the second network address of the first service provisioning environment; and
transmitting a second client request to the second network address to establish a session within the first service provisioning environment for obtaining the network service.

21. The method of claim 20, wherein,
the first network address of the first service provisioning environment is selected in accordance with a global load balancing strategy distributing workload among the service provisioning environments.

22. A network device for redirecting a client device to a network service in a communication network, wherein the communication network includes at least a first and a second service provisioning environment each capable of providing the network service, the first and second service provisioning environments being addressable under a common first domain name resolvable into a first network address of each service provisioning environment, the network device operating on behalf of the first service provisioning environment and comprising:
a first interface adapted to receive a first client request at the first network address of the first service provisioning environment;
a responder adapted to respond to the first client request with a redirection to a dedicated second domain name of the first service provisioning environment, the redirection being signaled to the client device and the second domain name being resolvable into a second network address of the first service provisioning environment;
a second interface adapted to receive a second client request at the second network address of the first service provisioning environment; and
a session initiator adapted to initiate the establishment of a session with the requesting client device to provide the network service.

23. A system including a client device capable of being redirected to a network service in a communication network, wherein the communication network includes at least a first and a second service provisioning environment each capable of providing the network service, the first and second service provisioning environments being addressable under a common first domain name resolvable into a first network address of each service provisioning environment, the client device comprising:
a transmitter adapted to transmit a first client request to the first network address of the first service provisioning environment;
an interface adapted to receive a redirection to a dedicated second domain name of the first service provisioning environment, the redirection being signaled to the client device and the second domain name being resolvable into a second network address of the first service provisioning environment; and
an address fetcher adapted to obtain the second network address of the first service provisioning environment and to initiate transmission of a second client request to the second network address to establish a session within the first service provisioning environment for obtaining the network service.

24. The system of claim 23, further comprising:
a domain name resolution device,
wherein the domain name resolution device comprises,
a domain name resolution mechanism associating the domain names and network addresses of the first and second service provisioning environments; and
a disabler adapted to disable a direction to the first or the second service provisioning environment by excluding the first network address of the corresponding service provisioning environment from domain name resolution.

* * * * *

UNITED STATES PATENT AND TRADEMARK OFFICE
CERTIFICATE OF CORRECTION

PATENT NO. : 8,127,018 B2
APPLICATION NO. : 11/898733
DATED : February 28, 2012
INVENTOR(S) : Stefan Frutiger It is certified that error appears in the above-identified patent and that said Letters Patent is hereby corrected as shown below:

Claim 5, column 23, line 63, "claims 3" should read -- claim 3 --.

Signed and Sealed this
First Day of May, 2012

David J. Kappos
*Director of the United States Patent and Trademark Office*